United States Patent
Bando et al.

(10) Patent No.: US 9,527,384 B2
(45) Date of Patent: Dec. 27, 2016

(54) DRIVING CONTEXT GENERATION SYSTEM FOR GENERATING DRIVING BEHAVIOR DESCRIPTION INFORMATION

(71) Applicants: DENSO CORPORATION, Kariya, Aichi-pref. (JP); The Ritsumeikan Trust, Kyoto (JP)

(72) Inventors: Takashi Bando, Nagoya (JP); Kazuhito Takenaka, Obu (JP); Tadahiro Taniguchi, Kyoto (JP)

(73) Assignees: DENSO CORPORATION, Kariya, Aichi-pref. (JP); THE RITSUMEIKAN TRUST, Nakagyo-Ku, Aichi-pref. (JP)

( * ) Notice: Subject to any disclaimer, the term of this patent is extended or adjusted under 35 U.S.C. 154(b) by 0 days.

(21) Appl. No.: 14/731,766

(22) Filed: Jun. 5, 2015

(65) Prior Publication Data
US 2015/0352999 A1 Dec. 10, 2015

(30) Foreign Application Priority Data
Jun. 6, 2014 (JP) .................................. 2014-117883

(51) Int. Cl.
*G08B 21/00* (2006.01)
*B60K 28/06* (2006.01)
(Continued)

(52) U.S. Cl.
CPC ............ *B60K 28/066* (2013.01); *B60W 40/09* (2013.01); *G08G 1/0104* (2013.01)

(58) Field of Classification Search
CPC .................................................... B60K 28/00
(Continued)

(56) References Cited

U.S. PATENT DOCUMENTS

2009/0234552 A1   9/2009   Takeda et al.

FOREIGN PATENT DOCUMENTS

| JP | 2007-176396 | 7/2007 |
| JP | 2007-334479 | 12/2007 |
| JP | 2013-250663 | 12/2013 |

OTHER PUBLICATIONS

T. Taniguchi et al, "Semiotic Prediction of Driving Behavior Using Unsupervised Double Articulation Analyzer," IEEE Intelligent Vehicles Symposium, Jun. 2012.
(Continued)

*Primary Examiner* — Jeffery Hofsass
(74) *Attorney, Agent, or Firm* — Harness, Dickey & Pierce, P.L.C.

(57) ABSTRACT

In a system, a behavior description generator extracts a feature portion from at least one of segmented behavior-data sequences corresponding to at least one target driving situation included in sequential driving situations, and generates behavior-description information indicative of a description of a driver's behavior associated with the at least one target driving situation. An event description generator sequentially detects traffic events in at least one environmental data sequence indicative of time-series driving environments of a vehicle. The event description generator generates event-description information including a description indicative of each of the detected traffic events. A context description generator extracts, from the sequentially detected traffic events, one target traffic event that is detected immediately adjacent to the feature portion. The context description generator generates context information indicative of a context between behavior-description information and the event-description information about the target traffic event.

9 Claims, 11 Drawing Sheets

(51) Int. Cl.
 *B60W 40/09* (2012.01)
 *G08G 1/01* (2006.01)
(58) Field of Classification Search
 USPC .................. 340/425.5, 438, 573.1; 701/1, 70
 See application file for complete search history.

(56) References Cited

OTHER PUBLICATIONS

K. Takenaka et al, "Contextual Scene Segmentation of Driving Behavior Based on Double Articulation Analyzer," IEEE/RSJ International Conference on Intelligent Robots and Systems, Oct. 2012.
D. Blei et al, "Latent Dirichlet Allocation", Journal of Machine Learning Research, 2003.
T. Griffiths & M. Steyvers, "Finding Scientific Topics," Proceedings of the National Academy of Sciences, Apr. 2004.
T. Nakamura et al, "Grounding of Word Meanings in Multimodal Concepts Using LDA," IEEE/RSJ International Conference on Intelligent Robots and Systems, Oct. 2009.

FIG. 3

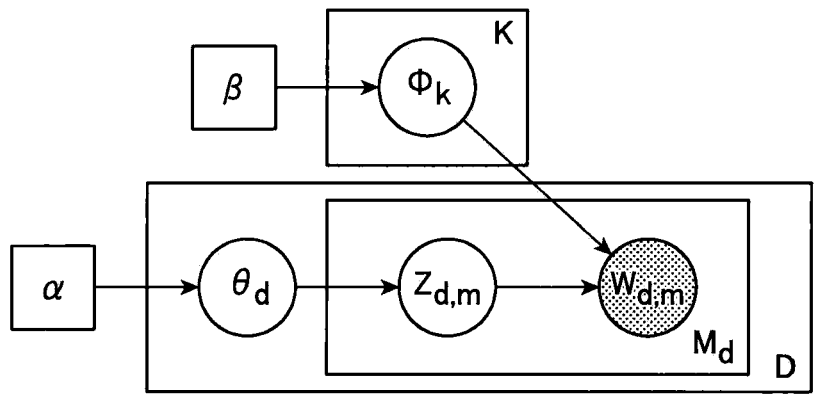

FIG. 4

| TOPIC | BEHAVIORAL DESCRIPTION |
|---|---|
| 1 | PRESSING GAS PEDAL |
| 2 | DRIVING AT HIGH SPEED WHILE PRESSING GAS PEDAL |
| 3 | DRIVING AT LOW SPEED |
| 4 | DRIVING AT MIDDLE SPEED |
| 5 | TURNING WHEEL TO THE RIGHT WHILE OPERATING PEDALS |
| 6 | DRIVING AT HIGH SPEED WHILE PRESSING DOWN GAS PEDAL |
| 7 | DRIVING AT MIDDLE SPEED |
| 8 | PRESSING GAS PEDAL |
| 9 | DRIVING QUITE SLOWLY WHILE OPERATING PEDALS |
| 10 | DRIVING AT LOW SPEED WHILE QUICKLY OPERATING GAS PEDAL |
| 11 | DRIVING AT MIDDLE SPEED |
| 12 | PRESSING BRAKE |
| 13 | PRESSING GAS PEDAL QUICKLY |
| 14 | PRESSING BRAKE |
| 15 | TURNING WHEEL TO THE RIGHT |
| 16 | TURNING WHEEL |
| 17 | PRESSING GAS PEDAL |
| 18 | DRIVING AT HIGH SPEED |
| 19 | LETTING UP ON GAS PEDAL |
| 20 | DRIVING AT LOW SPEED |
| 21 | TURNING WHEEL TO THE LEFT WHILE OPERATING PEDALS |
| 22 | SLIGHTLY PRESSING GAS PEDAL |
| 23 | DRIVING QUITE SLOWLY |
| 24 | PRESSING BRAKE WHILE DECELERATING |
| 25 | DRIVING AT LOW SPEED |

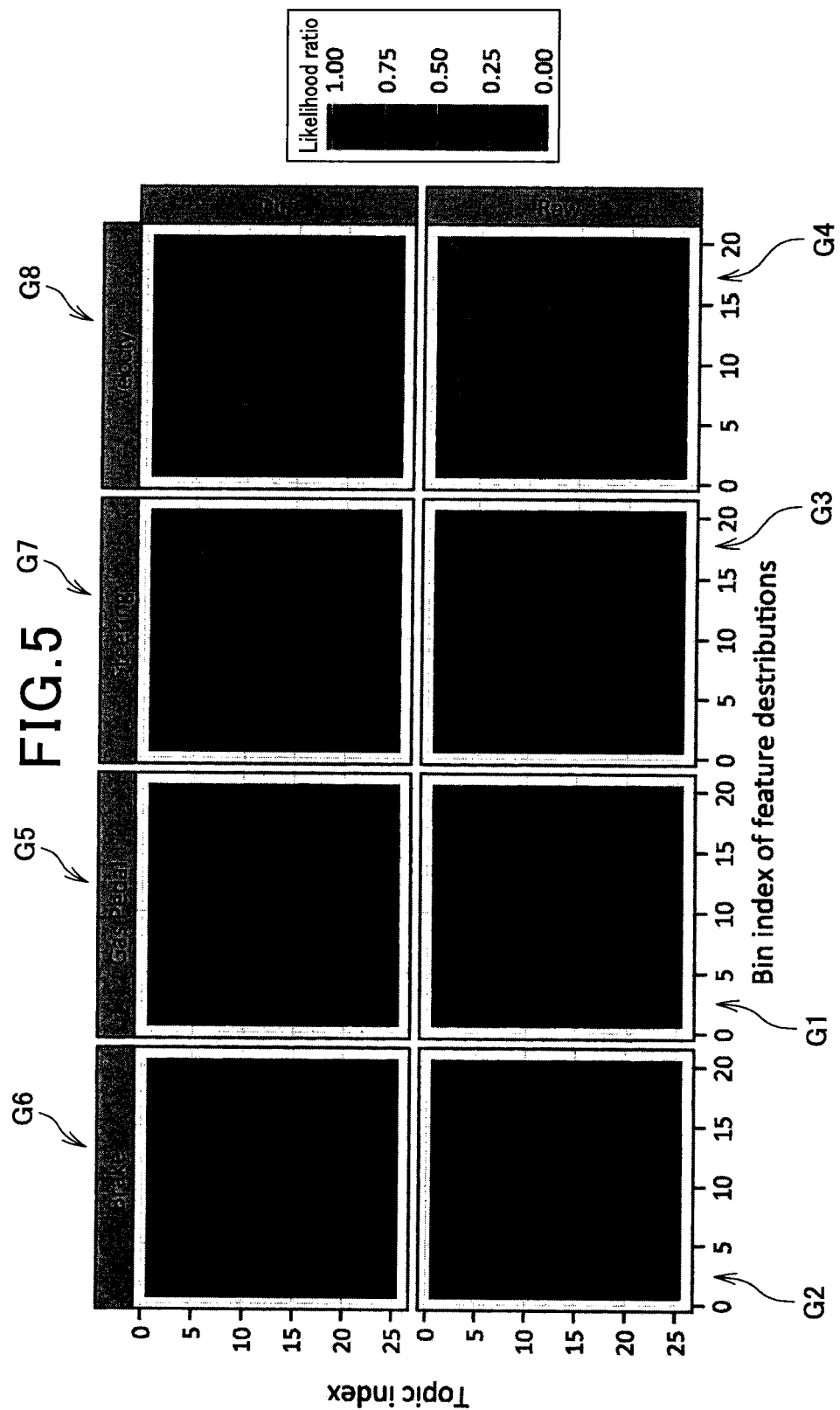

FIG.6

| | 1st–5th BINS | 6th–10th BINS | 11th–15th BINS | 16th–20th BINS | OTHERS |
|---|---|---|---|---|---|
| FIRST QUANTITY SEQUENCE FQ1 (GAS PEDAL) | SLIGHTLY PRESSING | | PRESSING | PRESSING DOWN | PRESSING |
| SECOND QUANTITY SEQUENCE FQ2 (BRAKE PEDAL) | SLIGHTLY PRESSING | PRESSING | | PRESSING DOWN | PRESSING |
| THIRD QUANTITY SEQUENCE FQ3 (STEERING WHEEL) | | TURNING WHEEL TO THE RIGHT | TURNING WHEEL TO THE LEFT | | TURNING WHEEL |
| FOURTH QUANTITY SEQUENCE FQ4 (VELOCITY) | DRIVING QUITE SLOWLY | DRIVING AT LOW SPEED | DRIVING AT MIDDLE SPEED | DRIVING AT HIGH SPEED | DRIVING |
| FIFTH QUANTITY SEQUENCE FQ5 (DIFFERENTIAL VALUE OF GAS PEDAL) | | LETTING UP ON | OPERATING | QUICKLY OPERATING | OPERATING |
| SIXTH QUANTITY SEQUENCE FQ6 (DIFFERENTIAL VALUE OF BRAKE PEDAL) | | LETTING UP ON | OPERATING | QUICKLY OPERATING | OPERATING |
| SEVENTH QUANTITY SEQUENCE FQ6 (DIFFERENTIAL VALUE OF STEERING WHEEL) | QUICKLY | | — | QUICKLY | — |
| EIGHTH QUANTITY SEQUENCE FQ8 (DIFFERENTIAL VALUE OF VELOCITY) | | | | | |

DRIVING CONTEXT GENERATION SYSTEM FOR GENERATING DRIVING BEHAVIOR DESCRIPTION INFORMATION

CROSS REFERENCE TO RELATED APPLICATION

This application is based on and claims the benefit of priority from Japanese Patent Application No. 2014-117883 filed on Jun. 6, 2014, which is incorporated in its entirety herein by reference.

TECHNICAL FIELD

The present disclosure relates to systems for driving context generation systems.

BACKGROUND

Various technologies for preventing the occurrence of traffic accidents and/or potentially serious traffic incidents are known. One specific example of these technologies, which is disclosed in Japanese Patent Publication No. 4780711, measures quantities of beginner-driver's operations using each of predetermined driver-operable devices installed in a vehicle while driving the vehicle.

The predetermined driver-operable devices are required to travel the vehicle.

The specific technology also measures quantities of expert-driver's operations using each of the predetermined driver-operable devices while driving the vehicle.

Then, the specific technology compares the quantities of the beginner-driver's operations with the corresponding quantities of the expert-driver's operations for each of the predetermined driver-operable devices.

This comparison detects some operations of some beginner drivers using at least one driver-operable device, whose operated quantities deviate from the corresponding operated quantities of the expert drivers using the corresponding at least one driver-operable device. The specific technology recognizes the detected operations of some beginner drivers using the corresponding at least one driver-operable device as abnormal operations. Then, the specific technology holds the abnormal operations for the at least one driver-operable device.

While a driver is currently driving the vehicle in which the specific technology is installed, the technology determines whether the driver has performed one of the abnormal operations using the at least one driver-operable device. The specific technology visually and/or audibly outputs a warning when determining that the driver has performed one of the abnormal operations using the at least one driver-operable device. The specific technology therefore aims to assist the driver of the vehicle to prevent the occurrence of traffic accidents and/or potentially serious traffic incidents due to one of the abnormal operations by the driver using the at least one driver-operable device.

SUMMARY

The specific technology determines, as abnormal operations, some operations of some beginner drivers using at least one driver-operable device, whose operated quantities deviate from the corresponding operated quantities of the expert drivers using the corresponding at least one driver-operable device.

Let us focus on operations of some beginner drivers using at least one driver-operable device, which are unsuitable for the corresponding driving circumstances, but whose operated quantities are similar to the corresponding operated quantities of the expert drivers using the corresponding at least one driver-operable device. Unfortunately, the specific technology cannot detect, as abnormal operations, the focused operations of some beginner drivers using the at least one driver-operable device; the focused operations will be referred to as unsuitable operations.

For example, when a beginner driver or an expert driver tries to drive a vehicle to travel in a straight line, an operated quantity of a steering wheel as an at least one driver-operable device by the beginner driver is similar to an operated quantity of the steering wheel by the expert driver.

In contrast, when a beginner driver operates the steering wheel to drive the vehicle in a straight line on a right-turn-only lane, the operated quantity of the steering wheel is similar to the operated quantity of the steering wheel by an expert driver, but the operation of the beginner driver is an unsuitable operation on the right-turn-only lane as a driving circumstance.

The specific technology therefore may be insufficient in assistance of a driver of a vehicle, who has performed one of the unsuitable operations, in order to prevent the occurrence of traffic accidents and/or potentially serious traffic incidents due to one of the unsuitable operations.

In view of the circumstances set forth above, one aspect of the present disclosure seeks to provide driving context generation systems, which are capable of addressing the problem set forth above.

Specifically, an alternative aspect of the present disclosure aims to provide such systems, each of which is capable of more efficiently assisting a driver of a corresponding vehicle according to a corresponding driving circumstance.

According to a first exemplary aspect of the present disclosure, there is provided a driving context generation system. The driving context generation system includes a discretizer configured to discretize at least one driving behavioral data sequence representing time-series driving behaviors of a vehicle into segmented behavior-data sequences. Each of the segmented behavior-data sequences corresponds to one of sequential driving situations of the vehicle. The driving context generation system includes a behavior description generator configured to extract a feature portion from at least one of the segmented behavior-data sequences corresponding to at least one target driving situation included in the sequential driving situations. The behavior description generator is configured to generate behavior-description information indicative of a description of a driver's behavior associated with the at least one target driving situation. The driving context generation system includes an event description generator configured to sequentially detect traffic events in at least one environmental data sequence indicative of time-series driving environments of the vehicle. Each of the detected traffic events has a potential to impact on driver's driving behaviors of the vehicle. The event description generator is configured to generate event-description information including a description indicative of each of the detected traffic events. The driving context generation system includes a context description generator configured to extract, from the sequentially detected traffic events, one target traffic event that is detected immediately adjacent to the feature portion. The context description generator is configured to generate context information indicative of a context between the behavior-description information generated by the behavior description generator and the event-description information about the target traffic event generated by the event description generator.

According to a second exemplary aspect of the present disclosure, there is provided a computer program product for a driving context generation system. The computer program product includes a non-transitory computer-readable storage medium, and a set of computer program instructions embedded in the computer-readable storage medium, the instructions causing a computer to carry out (1) A first step of discretizing at least one driving behavioral data sequence representing time-series driving behaviors of a vehicle into segmented behavior-data sequences, each of the segmented behavior-data sequences corresponding to one of sequential driving situations of the vehicle (2) A second step of extracting a feature portion from at least one of the segmented behavior-data sequences corresponding to at least one target driving situation included in the sequential driving situations (3) A third step of generating behavior-description information indicative of a description of a driver's behavior associated with the at least one target driving situation (4) A fourth step of sequentially detecting traffic events in at least one environmental data sequence indicative of time-series driving environments of the vehicle, each of the detected traffic events having a potential to impact on driver's driving behaviors of the vehicle (5) A fifth step of generating event-description information including a description indicative of each of the detected traffic events (6) A sixth step of extracting, from the sequentially detected traffic events, one target traffic event that is detected immediately adjacent to the feature portion (7) A seventh step of generating context information indicative of a context between the behavior-description information generated by the third step and the event-description information about the target traffic event generated by the fifth step.

According to a third exemplary aspect of the present disclosure, there is provided a driving context generation method. The driving context generation method includes (1) A first step of discretizing at least one driving behavioral data sequence representing time-series driving behaviors of a vehicle into segmented behavior-data sequences, each of the segmented behavior-data sequences corresponding to one of sequential driving situations of the vehicle (2) A second step of extracting a feature portion from at least one of the segmented behavior-data sequences corresponding to at least one target driving situation included in the sequential driving situations (3) A third step of generating behavior-description information indicative of a description of a driver's behavior associated with the at least one target driving situation (4) A fourth step of sequentially detecting traffic events in at least one environmental data sequence indicative of time-series driving environments of the vehicle, each of the detected traffic events having a potential to impact on driver's driving behaviors of the vehicle (5) A fifth step of generating event-description information including a description indicative of each of the detected traffic events (6) A sixth step of extracting, from the sequentially detected traffic events, one target traffic event that is detected immediately adjacent to the feature portion (7) A seventh step of generating context information indicative of a context between the behavior-description information generated by the third step and the event-description information about the target traffic event generated by the fifth step.

Each of the first to third exemplary aspects of the present disclosure is configured to generate the context information indicative of the context between the behavior-description information and the event-description information about the target traffic event. This configuration makes it possible to provide the context information based on the context between the behavior-description information and the event-description information about the target traffic event when, for example, the vehicle is expected to encounter the target traffic event. That is, every time the vehicle is about to encounter the target traffic event, the driving context generation system enables assistance of driver's driving according to the context information indicative of the context, i.e. a causality relationship, between a driver's driving behavior and the corresponding target traffic event. This makes it possible to provide more efficient assistance to a driver of the vehicle according to traffic events.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 3 is a block diagram schematically illustrating an example of a graphical model hypothesized by latent Dirichlet allocation (LDA) according to this embodiment;

FIG. 4 is a diagram schematically illustrating an example of driver behavioral descriptions for respective twenty-five driving topics stored in a topic description database illustrated in FIG. 1;

FIG. 5 is a combination of graphs each of which illustrates, in each of driving topics, a distribution of corresponding likelihood ratios at respective bins according to this embodiment;

FIG. 6 is a table schematically illustrating an example of a predetermined primitive behavioral expression list according to this embodiment;

DETAILED DESCRIPTION OF EMBODIMENT

A specific embodiment of the present disclosure will be described hereinafter with reference to the accompanying drawings.

Figure 1A:
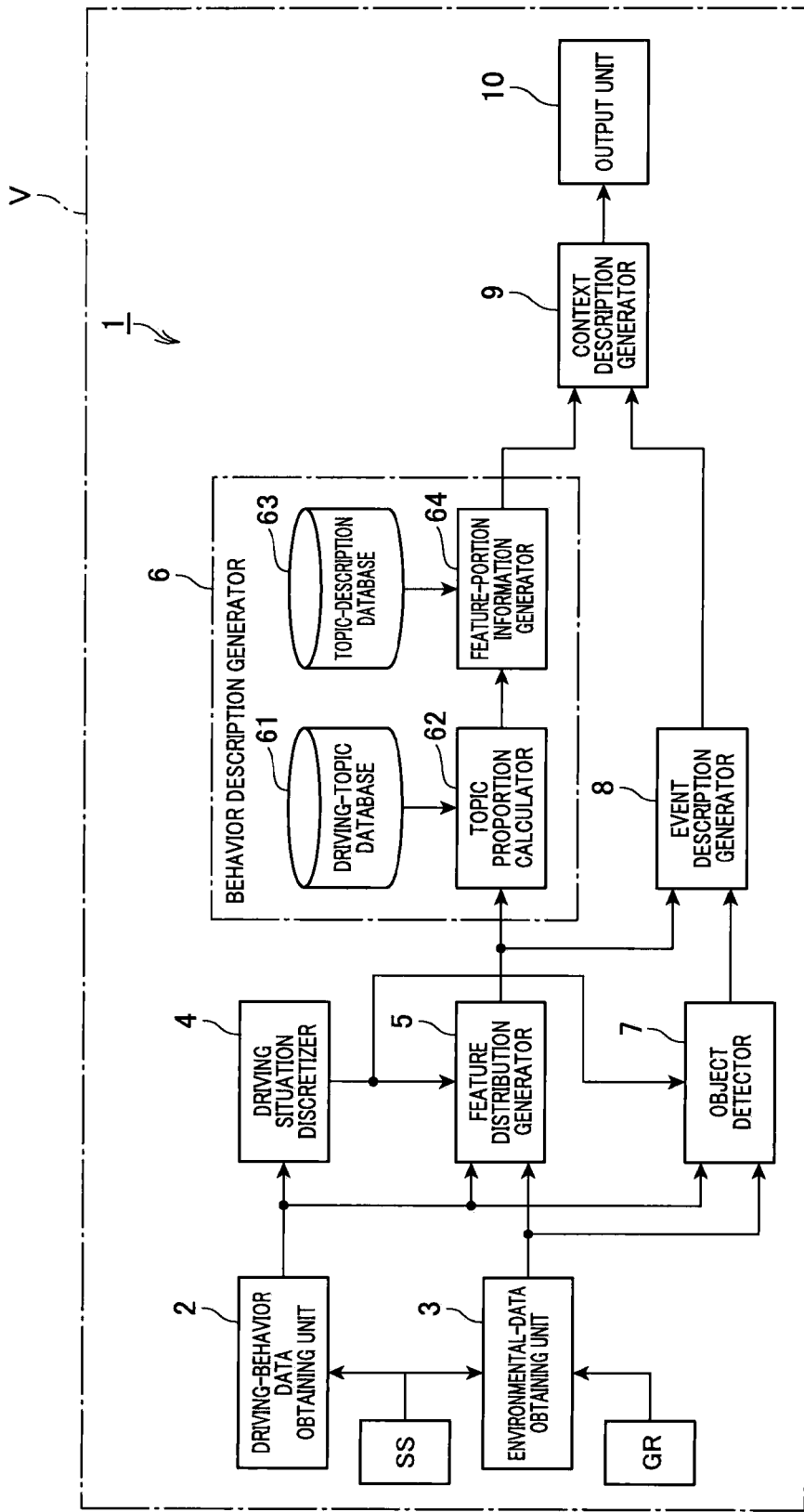
FIG. 1A is a block diagram schematically illustrating an example of the functional structure of a driving context generation system according to an embodiment of the present disclosure.

Referring to FIG. 1A, a driving context generation system 1 according to the specific embodiment of the present disclosure includes a driving-behavior data obtaining unit 2, an environmental-data obtaining unit 3, a driving situation discretizer 4, and a feature distribution generator 5. The driving context generation system 1 also includes a behavior description generator 6, an object detector 7, an event description generator 8, a context description generator 9, and an output unit 10.

Figure 1B:
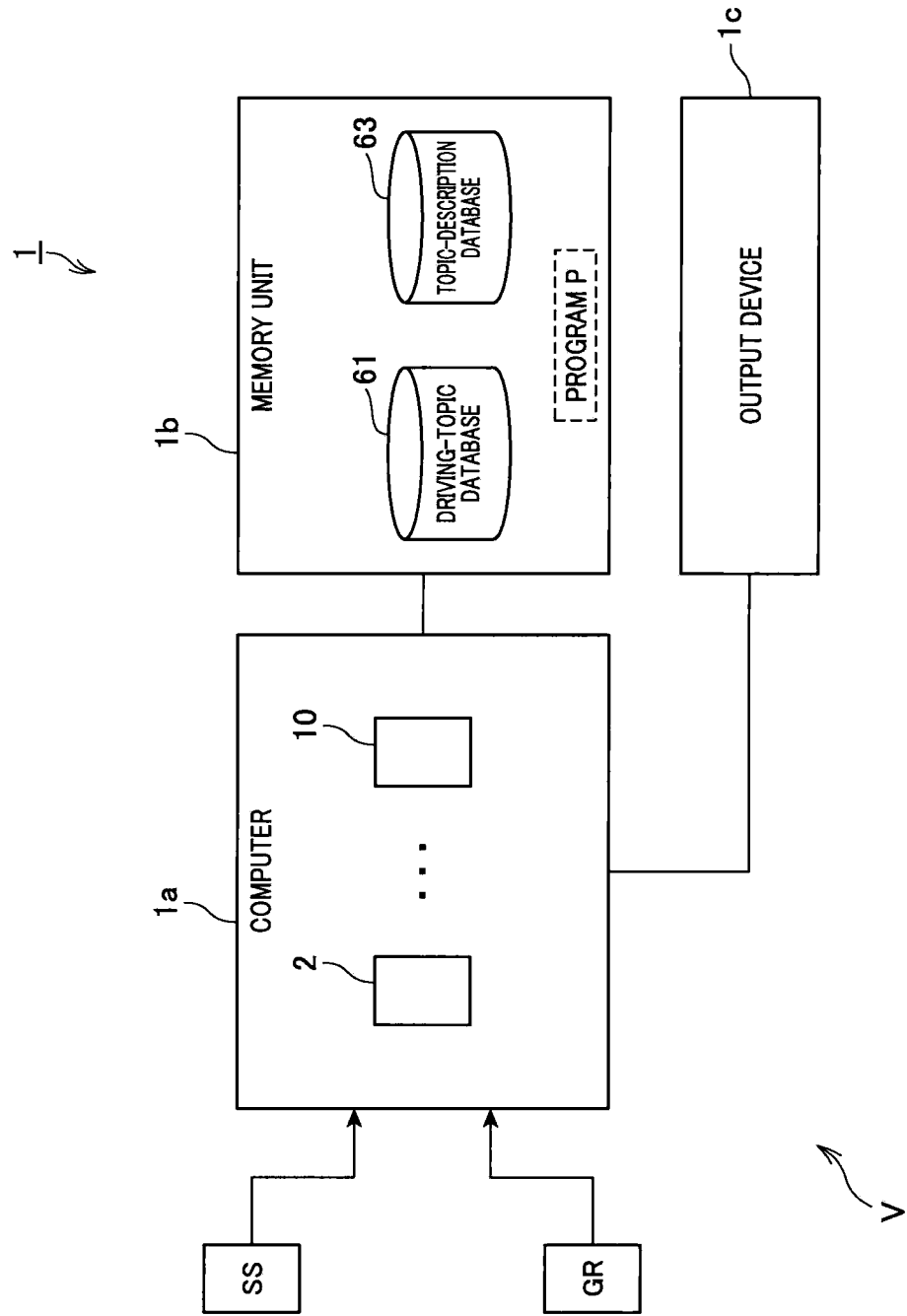
FIG. 1B is a block diagram schematically illustrating an example of the hardware structure of the driving context generation system illustrated in FIG. 1A.

The driving context generation system 1 is installed in a vehicle V, and is designed as a well-known microcomputer circuit comprised of, for example, a computer 1a, a memory unit 1b including, for example, at least one non-transitory computer-readable storage medium, and an output device 1c (see FIG. 1B). The functional blocks 2 to 10 illustrated in FIG. 1A can be implemented by running, by the computer 1a, at least one program P stored in the memory unit 1b (see FIG. 1B). In other words, the driving context generation system 1 includes the functions 2 to 10 to be implemented by the computer 1a. As another example, the driving context generation system 1 can be designed as a hardware circuit comprised of hardware units respectively corresponding to the functional blocks 2 to 10 illustrated in FIG. 1A. As a further example, the driving context generation system 1 is designed as a hardware/software hybrid circuit, some of these functional blocks being implemented by some hardware units, and the remaining functional blocks being implemented by software to be run by the computer 1a.

The driving-behavior data obtaining unit 2 is communicably connected to sensors SS. The sensors SS include first type of sensors each repeatedly measuring a current quantity or a current state of operation of a corresponding one of driver-operable devices installed in the vehicle V. Then, the first type of sensors outputs a time-series data sequence consisting of sequentially or cyclically measured pieces of data indicative of how the operated quantity or the operated condition of a corresponding one of the driver-operable devices changes.

For example, the first type of sensors includes an accelerator sensor, a brake sensor, a steering sensor, indicator sensors, and a shift-position sensor.

The accelerator sensor is operative to output a time-series data sequence consisting of repeatedly measured pieces of data indicative of how the driver operates, i.e. changes, a quantity or a state of a driver-operable gas pedal of the vehicle V linked to a throttle valve changes. Changing the quantity or state of the gas pedal to change the position of the throttle valve controls the velocity of the vehicle V.

The brake sensor is operative to output a time-series data sequence consisting of repeatedly measured pieces of data indicative of how the driver operates, i.e. changes, a quantity or state of a driver-operable brake pedal of the vehicle V changes. Changing the quantity or state of the brake pedal controls the velocity of the vehicle V. The steering sensor is operative to output a time-series data sequence consisting of sequentially or cyclically measured pieces of data indicative of how the driver operates, i.e. changes a quantity, i.e. an angle, of a driver-operable steering wheel of the vehicle V changes.

Each of the indicator sensors is operative to output a time-series data sequence consisting of repeatedly measured pieces of data indicative of how the driver operates, i.e. changes, a corresponding one of side directional indicators of the vehicle V for indicating a corresponding turning signal. The shift position sensor is operative to output a time-series data sequence consisting of repeatedly measured pieces of data indicative of how the driver operates, i.e. changes, a driver-selectable position of a transmission installed in the vehicle V. For example, the positions of the transmission selectable by a driver represent a plurality of speed-change positions including, for example, forward positions of the vehicle V, a reverse position for reverse drive of the vehicle V, a neutral position.

The time-series measurement data sequences output from the first type of sensors will be referred to as time-series driving-data sequences.

The sensors SS also includes a second type of sensors each repeatedly measuring a value of a parameter indicative of how a behavior of the vehicle V changes, and outputting a time-series measurement data sequence consisting of the repeatedly measured values of the corresponding parameter.

For example, the second type of sensors includes a vehicle speed sensor and a yaw-rate sensor. The vehicle speed sensor is operative to output a time-series measurement data sequence indicative of how a speed (velocity) of the vehicle V changes. The yaw-rate sensor is operative to output a time-series measurement data sequence how an angular velocity, i.e. a yaw rate, around a vertical axis of the vehicle V changes. These time-series measurement data sequences of the second type of sensors represent how the behavior of the vehicle V changes based on driver's operations of the driver-operable devices.

The time-series measurement data sequences output from the second type of sensors will be referred to as time-series behavior-data sequences.

The driving-behavior data obtaining unit 2 receives the time-series driving-data sequences and the time-series behavior-data sequences from the sensors SS.

The driving-behavior data obtaining unit 2 differentiates the time-series driving-data sequences to generate first differential data sequences. Additionally, the driving-behavior data obtaining unit 2 differentiates the time-series behavior-data sequences to generate second differential data sequences.

Then, the driving-behavior data obtaining unit 2 groups the time-series driving-data sequences, the time-series behavior-data sequences, the first differential data sequences, and the second differential data sequences. This generates multidimensional time-series data sequences comprised of the group of the time-series driving-data sequences, the time-series behavior-data sequences, the first differential data sequences, and the second differential data sequences. The driving-behavior data outputs, as driving behavioral data sequences, the multidimensional time-series data sequences to each of the driving situation discretizer 4, feature distribution generator 5, and behavior description generator 6.

The environmental-data obtaining unit 3 is also communicably connected to the sensors SS.

The sensors SS also include an image sensor repeatedly picking up an image of a corresponding region around the vehicle V, and outputting a time-series image data sequence consisting of repeatedly measured images of a corresponding region around the vehicle V.

The sensors SS further include a radar sensor repeatedly measures a position of at least one object located around the vehicle V, and a relative speed of the at least one object with respect to the vehicle V using radar waves, such as ultrasonic waves or millimeter waves. The radar sensor outputs the repeatedly measured positions of the at least one object as a time-series position-data sequence. The radar sensor also outputs the repeatedly measured relative speeds of the at least one object with respect to the vehicle V as a time-series relative-speed data sequence.

The sensors SS also includes an interior measurement unit (IMU) that repeatedly measures 3-axis, i.e. three-dimensional, angular velocities and 3-axis, i.e. three-dimensional, acceleration values using gyro sensors and/or accelerometers. The IMU outputs the repeatedly measured three-dimensional angular velocities as a time-series 3D angular-velocity data sequence. The IMU also outputs the repeatedly measured three-dimensional acceleration values as a time-series acceleration-data sequence.

In addition, the sensors SS includes sensors each repeatedly measuring a corresponding one of a time zone at the driving, a weather condition, and the state of infrastructures located around the vehicle V. Each of the sensors outputs the repeatedly measured time zones as a time-series time-zone data sequence, the repeatedly measured weather conditions as a time-series weather-data sequence, and the repeatedly measured states of infrastructures located around the vehicle V as a time-series infrastructural-data sequence.

The environmental-data obtaining unit 3 is also communicably connected to a global positioning system (GPS) receiver GR. The GPS receiver GR repeatedly receives signals sent from GPS satellites, and repeatedly generates three-dimensional positional information based on the repeatedly received signals. The GPS receiver GR outputs a time-series positional data sequence consisting of the repeatedly generated pieces of three-dimensional positional information.

The environmental-data obtaining unit 3 receives
(1) The time-series image data sequence
(2) The time-series position-data sequence
(3) The time-series relative-speed data sequence
(4) The time-series 3D angular-velocity data sequence
(5) The time-series acceleration-data sequence
(6) The time-series time-zone data sequence
(7) The time-series weather-data sequence
(8) The time-series infrastructural-data sequence.

That is, these data sequences (1) to (8) represent driving environments of the vehicle V.

The environmental-data obtaining unit 3 outputs these data sequences to the feature distribution generator 5 and the behavior description generator 6 as environmental data sequences.

The driving situation discretizer 4 includes a driver model that simulates driving operations of drivers and recognition operations of the environments around each driver. The driving situation discretizer 4 statistically analyzes the driving behavioral data sequences output from the driving-behavior data obtaining unit 2. This statistic analysis extracts each point of time where a common driver feels change of a current driving situation to another driving situation. The driving situations represent organized driving conditions and driving environments of a vehicle. For example, each of the driving situations represents various items of information indicative of how the driver drives a vehicle under what kind of environments around the vehicle.

According to the results of extraction, the driving situation discretizer 4 discretizes the driving behavioral data sequences into a plurality of segmented behavior-data sequences; each of the segmented behavior-data sequences belongs to a corresponding one of the driving situations. In other words, the driving situation discretizer 4 extracts the sequence of time sections, each of which matches with a corresponding one of the segmented behavior-data sequences.

For example, the driving situation discretizer 4 uses a double articulation analyzer (DAA) to perform such discretization in accordance with an unsupervised driving-situation partitioning method using a double articulation structure.

In the DAA, various vehicle states obtained from many time-series driving behavioral data sequences in a multidimensional data space representing a range of each of the time-series driving behavioral data sequences are defined as clusters. In addition, predetermined values are determined as respective transition probabilities among the clusters. The DAA includes information about the clusters and the transition probabilities among the clusters.

According to the information, the DAA performs a statistical analysis that divides the driving behavioral data sequences obtained by the driving-behavior data obtaining unit 2 into a plurality of subsets each belonging to a corresponding one of the vehicle states, i.e. clusters. Then, the DAA assigns predetermined identification symbols to the respective clusters, thus converting the driving behavioral data sequences into a symbol sequence.

For example, the DAA can generate a symbol sequence corresponding to the driving behavioral data sequences using Hierarchical Dirichlet Process-Hidden Markov Model (HDP-HMM) as one of models each designed based on a predetermined number of hidden states, i.e. vehicle states, and transition probabilities among the hidden states. The HDP-HMM uses the clusters that were previously determined based on learning, and uses the transition probabilities among the clusters that were previously determined.

Next, the DAA uses a nested Pitman-Yor language model (NPYLM) as an example of unsupervised chunking method for discrete character strings using statistic information to convert the symbol sequence into the segmented sequences, i.e. segmented symbol sequences, each corresponding to one of the driving situations, i.e. the driving situations (see 1-2-3-4-5- . . . 12-13). While converting the symbol sequence into the segmented symbol sequences, the DAA maximizes an occurrence probability of the whole of the segmented symbol segments. This causes the driving behavioral data sequences to become a plurality of segmented behavior-data sequences each corresponding to one of the predetermined driving situations. Note that the DAA uses the transition probabilities among the driving situations that were previously calculated based on learning, and uses an occurrence probability of each driving situation that was previously calculated based on learning.

Note that the DAA to which HDP-HMM and/or HPYLM have been applied is for example described in detail in (1) A first non-patent document, which is "*Semiotic Prediction of Driving Behavior using Unsupervised Double Articulation Analyzer*", written by T. Taniguchi et al, IEEE Intelligent Vehicles Symposium, 2012

(2) A second non-patent document, which is "*Contextual Scene Segmentation of Driving Behavior based on Double Articulation Analyzer*", written by K. Takenaka et al., IEEE/RSJ International Conference on Intelligent Robots and Systems, 2012.

The disclosures of the first and second non-patent documents are incorporated entirely herein by reference.

Note that the driving situation discretizer 4 can obtain the segmented behavior-data sequences using one of other analyzers except for the DAA, and specific models in other models except for the HDP-HMM and NPYLM.

The feature distribution generator 5 generates a distribution of feature quantities included in each of the segmented behavior-data sequences, in other words, included in each of the driving situations. Similarly, the feature distribution generator 5 generates a distribution of feature quantities included in each of the environmental data sequences output from the environmental-data obtaining unit 3 for each of the driving situations.

For example, each of the segmented behavior-data sequences include (1) A first feature quantity sequence FQ1, which is the change of quantity of the driver's operation of the driver-operable gas pedal (2) A second feature quantity sequence FQ2, which is the change of quantity of the driver's operation of the driver-operable brake pedal (3) A third feature quantity sequence FQ3, which is the change of quantity of the driver's operation of the steering wheel (4) A fourth feature quantity sequence FQ4, which is the change of the velocity of the vehicle V (5) Fifth to seventh feature quantity sequences FQ5 to FQ7, each of which is the sequence of differential quantities of a corresponding one of the first to third feature quantity sequences FQ1 to FQ3

(6) An eighth feature quantity sequence FQ8, which is the sequence of differential quantities of the fourth feature quantity sequence FQ4.

Each of the first to eighth feature quantity sequences FQ1 to FQ8 has a corresponding range from a lower limit to an upper limit.

The feature distribution generator 5 uses the range of each of the first to eighth feature quantity sequences FQ1 to FQ8 as a corresponding feature space, and generates a distribution of each of the first to eighth feature quantities FQ1 to FQ8 in a corresponding one of the feature spaces.

Specifically, for the first feature quantity sequence FQ1, the feature distribution generator 5 divides the corresponding range of the first quantity sequence FQ1 by a predetermined number, such as 20, thus generating twenty classes, referred to twenty bins, i.e. twenty ranges, of the first feature quantity sequence FQ1. Then, the feature distribution generator 5 generates a bar for each of the twenty bins; the height of the bar for each of the twenty bins represents the frequency of appearance of corresponding feature quantities, in other words, the occurrence rate of corresponding feature quantities, included in the corresponding bin.

This generates a distribution of the feature quantities constituting the first feature quantity sequence FQ1 as a histogram. The feature distribution generator 5 generates a distribution of each of the remaining second to eighth feature quantity sequences FQ2 to FQ8 as a histogram in the same manner as a distribution of the first feature quantity sequence FQ1. More concretely, the computer 1*a* serves as the feature distribution generator 5 to generate each of the feature-quantity distributions in the memory space of the memory unit 1*b*.

Next, let us take the time-series image data sequence as an example of the environmental data sequences about how to generate a distribution of feature quantities included in each of the environmental data sequences for each of the driving situations.

The feature distribution generator 5 divides the measured images constituting the time-series image data sequence for each of the driving situations, thus obtaining segmented images corresponding to each of the driving situations. The feature distribution generator 5 uses, as target feature quantities, scale-invariant feature transform (SIFT) quantities included in the segmented images for each of the driving situations.

Specifically, the feature distribution generator 5 compresses the segmented images for each of the driving situations so that each of the compressed images has a predetermined pixel matrix, for example, 320×240 pixel matrix. Then, the feature distribution generator 5 sets a number of, for example, 3,072 local regions each having a 24×24 pixel matrix on the 320×240 pixel matrix such that their adjacent local regions partially overlap with each other. For example, a predetermined position, such as the center, of one of the adjacent local regions is five-pixel apart from that of the other thereof.

Then, the feature distribution generator 5 obtains SIFT quantities in each of the local regions in each of the compressed images as feature quantities.

The feature distribution generator 5 uses the range of the SIFT quantities as a feature space, and generates a distribution of the SIFT quantities in the feature space.

Specifically, the feature distribution generator 5 generates a bar for each of predetermined bins; the height of the bar for each of the predetermined bins represents the frequency of corresponding some of the SIFT quantities. This generates a distribution of the SIFT quantities as a histogram. The predetermined bins are preferably determined based on learning. For example, the feature distribution generator 5 clusters a feature space corresponding to the range of the SIFT quantities using a known clustering method, such as k-means, thus generating clusters to be used as bins of the SIFT quantities. The feature distribution generator 5 can use other feature quantities in place of the SIFT quantities.

Accordingly, these operations of the feature distribution generator 5 generate a group of feature-quantity distributions for each of the driving situations; the group of the feature-quantity distributions for each of the driving situations includes (1) A first type of feature-quantity distributions based on the segmented behavior-data sequences for a corresponding one of the driving situations (2) A second type of feature-quantity distributions based on the time-series environmental data sequences for a corresponding one of the driving situations.

This embodiment for example defines that the number of the first and second types of feature-quantity distributions included in each of the driving situations is set to n where n is an integer equal to or more than 2. Specifically, the n feature-quantity distributions included in each of the driving situations can be referred to as the first feature-quantity distribution (first distribution) 1, . . . , to the n-th feature-quantity distribution (n-th distribution) n.

The behavior description generator 6 includes a driving-topic database 61, a topic proportion calculator 62, a topic-description database 63, and a feature-portion information generator 64.

The driving-topic database 61 has stored therein information indicative of a plurality of, for example, twenty-five, driving topics. Each of the driving topics represents a corresponding basic driving situation that frequently appears while a vehicle is travelling.

Figure 2:
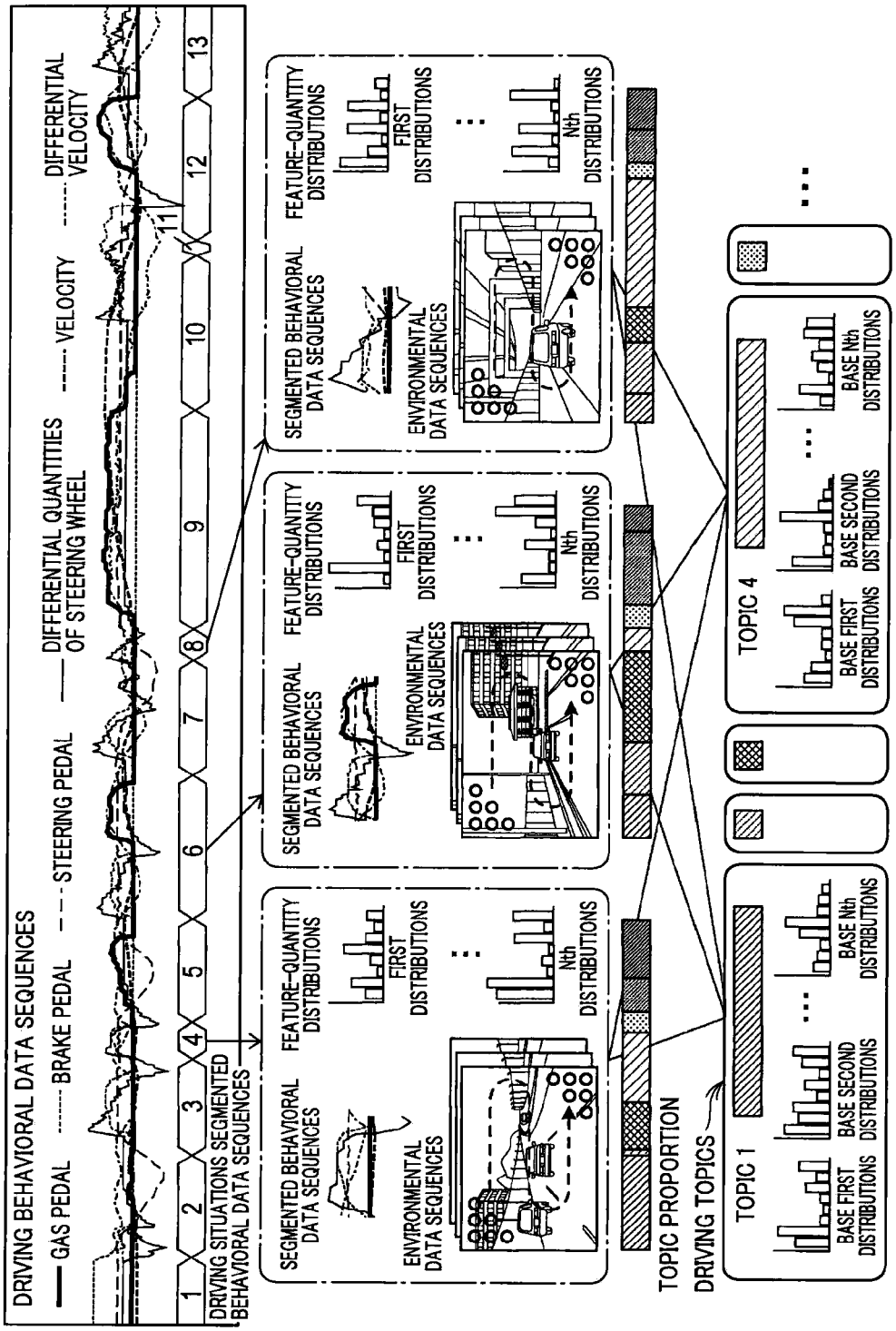
FIG. 2 is a diagram schematically illustrating an example of how driving topics are generated, and how a topic proportion for each of the driving topics is generated according to this embodiment.

Each of the driving topics is composed of n base feature-quantity distributions whose number n is identical to the number n of the n feature-quantity distributions included in each of the driving situations (see FIG. 2). The n base feature-quantity distributions can be referred to as the first base feature-quantity distribution (first base distribution) 1, . . . , and the n-th base feature-quantity distribution (n-th base distribution) n.

The information of the twenty-five driving topics is used to express the group of the first to n-th feature-quantity distributions for each of the driving conditions as a combination of at least some of the driving topics.

Next, how the driving topics have been generated will be described hereinafter.

This embodiment uses a latent topic model used in the field of natural language processing when (1) Each of the segmented behavior-data sequences, which corresponds to one of the driving situations, is regarded as one sentence (2) Measured, i.e. observed, feature quantities are regarded as individual words.

In particular, as described above, each of the driving topics is based on plural modalities, i.e. the driving behavioral data sequences and the environmental data sequences. In order to estimate the driving topics configured set forth above using the n base feature quantity distributions, this embodiment can use multimodal latent Dirichlet allocation, i.e. multimodal LDA, which is an extended method of LDA.

LDA hypothesizes a graphical model for example illustrated in FIG. 3. In FIG. 3, reference character D represents the number of all the drive situations, and reference character Ma represents the number of image fames included in a d-th driving situation; d is an identifier of a driving situation in the D driving situations. Reference character K represents the number of topics, and reference character $w_{d,m}$ represents a feature quantity observed, i.e. measured, in an m-th frame of the d-th driving situation; m represents an identifier of a frame in the $M_d$ frames. Reference character $z_{d,m}$ represents a topic indicator variable indicative of a topic allocated for the feature quantity $w_{d,m}$; the topic indicator variable $z_{d,m}$ takes one of natural numbers 1 to K. Reference character $\theta_d$ represents a multinomial distribution parameter $\theta$ indicative of the ratio of respective topics included in the d-th situation thereamong, and $\phi_k$ represents a multinomial distribution parameter $\phi$ indicative of the ratio of respective feature quantities generated from a k-th topic thereamong; k represents an identifier of a topic in the K topics. Reference characters $\alpha$ and $\beta$ represent parameters for the respective multinomial distribution parameters $\theta_d$ and $\phi_k$.

The multinomial distribution parameter $\theta_d$, the multinomial distribution parameter $\phi_k$, the topic indicator variable $z_{d,m}$, and the feature quantity $w_{d,m}$ are respectively defined by the following equations (1) to (4):

$$\theta_d \sim \mathrm{Dir}(\theta;\alpha) \quad (1)$$

$$\phi_k \sim \mathrm{Dir}(\phi;\beta) \quad (2)$$

$$z_{d,m} \sim \mathrm{Mult}(z;\theta_d) \quad (3)$$

$$w_{d,m} \sim \mathrm{Multi}(w;\phi_{z_{d,m}}) \quad (4)$$

Where Dir represents a Dirichlet distribution, and Multi represents a multinomial distribution.

Using the model illustrated in FIG. 3 in accordance with a known expectation-maximization (EM) algorithm enables the multinomial distribution parameters $\theta$ and $\phi$ to be estimated; the EM algorithm alternates between performing an expectation (E) step, which creates a function for the expectation of the log-likelihood evaluated using the current estimate for the parameters, and a maximization (M) step, which computes parameters maximizing the expected log-likelihood found on the E step.

This estimation can use one of approximation methods, such as variational Bayes or Gibbs sampling. Such approximation methods are for example described in detail in (1) A third non-patent document, which is "*Latent Dirichlet Allocation*", wrote by D. Blei et al, Journal of Machine Learning Research 2003

(2) A fourth non-patent document, which is "*Finding Scientific Topics*", wrote by T. Griffiths & M. Steyvers, Proceedings of the National Academy of Sciences, 2004.

The disclosures of the third and fourth non-patent documents are incorporated entirely herein by reference, and therefore, detailed descriptions of how each of the multinomial distribution parameters $\theta$ and $\phi$ is estimated are omitted.

Additionally, how LDA is expanded into multimodal LDA is for example described in detail in the following fifth non-patent document:

"*Grounding of word meanings in multimodal concepts using LDA*" wrote by T. Nakamura et al, IEEE/RSJ International Conference on Intelligent Robots and Systems, 2009

The disclosure of the fifth non-patent document is incorporated entirely herein by reference, and therefore, detailed descriptions of how LDA is expanded into multimodal LDA are omitted.

In particular, the driving topics according to this embodiment are for example generated based on many feature-quantity distributions for learning previously generated in the following manner:

First, the driving-behavior data obtaining unit 2, the environmental-data obtaining unit 3, the driving situation discretizer 4, and the feature distribution generator 5 are operating while the vehicle V is travelling. These operations generate learning first to n-th feature-quantity distributions for each of the driving situations; the learning first to n-th feature-quantity distributions for each of the driving situations are correlated with corresponding learning images for a corresponding one of the driving situations.

Next, executing the multimodal LDA using the generated learning first to n-th feature-quantity distributions for each of the driving situations enables first to twenty-fifth driving topics, each of which is comprised of first to n-th base feature quantity distributions, to be estimated.

As described above, each of the driving topics based on a corresponding group of the first to n-th base feature quantity distributions set forth above represents a corresponding specific driving situation that latently, i.e. potentially, exists in corresponding driving behavioral data sequences and environmental data sequences, and that frequently appears while a driver is driving the vehicle V.

The topic proportion calculator 62 selects some driving topics in all the driving topics stored in the database 61 for each of the driving situations. The topic proportion calculator 62 also calculates the percentages of the selected driving topics with respect to the whole of the selected driving topics such that the calculated percentages of the selected driving topics most suitably expresses the first to n-th feature-quantity distributions included in a corresponding one of the driving situations (see FIG. 2).

Specifically, the topic proportion calculator 62 executes only one or more E steps included in the EM algorithm, thus calculating a topic proportion for each of the driving situations. The topic proportion for each of the driving situations represents the percentages of selected driving topics to the whole of the selected driving topics for the first to n-th feature-quantity distributions included in a corresponding one of the driving situations.

For example, a topic proportion $\theta_d$ for a d-th driving situation can be expressed by the following equation (5):

$$\theta_d = (\theta_{d,1}, \theta_{d,2}, \theta_{d,3}, \ldots, \theta_{d,K}) \quad (5)$$

Where $TP_k$ represents a k-th driving topic $TP_k$ included in a topic proportion $\theta_d$, k represents an identifier of a topic in K driving topics $TP_1$ to $TP_K$, and $\theta_{d,k}$ represents a content ratio of the k-th driving topic $TP_k$ in the topic proportion $\theta_d$.

That is, the topic proportion calculator 62 calculates the sequence of topic proportions $\theta_d$ of the respective driving situations.

The topic description database 63 has stored therein driver behavioral descriptions defined to correlate with the respective twenty-five driving topics (see FIG. 4). That is, a driver's typical driving behavior corresponding to each driving topic has been described to correlate with the corresponding driving topic.

Next, how the driver behavioral descriptions for each of the twenty-five driving topics have been generated will be described as an example hereinafter.

First, a driving-topic generation method according to this embodiment uses the first type of feature-quantity distributions included in the first to n-th base feature-quantity distributions constituting each of the twenty-five driving topics in order to generate the driver behavioral descriptions for each of the twenty-five driving topics. Then, the driving-topic generation method extracts, from the first type of feature-quantity distributions, feature quantities that are specific to each of the twenty-five driving topics using a likelihood ratio described later, thus generating driver behavioral descriptions based on the results of the extraction for each of the twenty-five driving topics.

Specifically, the driving-topic generation method calculates a likelihood ratio $L_{i,k}$ as a driving behavioral feature in accordance with the following equation (6):

$$L_{i,k} = \frac{p(w_i | \phi_k)}{\sum_k p(w_i | \phi_k)} \quad (6)$$

Where
(1) $w_i$ represents feature quantities belonging to an i-th bin, i representing an identifier of a bin included in all the twenty bins
(2) $TP_k$ represents a k-th driving topic identified by k
(3) $\phi_k$ represents a multinomial distribution indicative of the base feature-quantity distributions of the k-th driving topic $TP_k$,
(4) $p(w_i | \phi_k)$ represents the conditional probability of the feature quantities $w_i$ given multinomial distribution $\phi_k$ of the k-th driving topic $TP_k$ $$\sum_k p(w_i | \phi_k) \quad (5)$$

represents the sum of all the conditional probabilities $p(w_i | \phi_k)$ obtained for all the driving topics.

The likelihood ratio $L_{i,k}$ defined in the equation (6) is an indicator called an inverse document frequency (IDF), which represents the frequency, i.e. the probability, of feature quantities, which belong to an i-th bin, included in only a specific driving topic $TP_k$.

FIG. 5 includes
(1) A first graph G1 illustrating the likelihood ratios $L_{i,k}$ of feature quantities of the first quantity sequence FQ1 belonging to a corresponding one of the bins for each of the driving topics
(2) A second graph G2 illustrating the likelihood ratio $L_{i,k}$ of feature quantities of the second quantity sequence FQ2 belonging to each of the bins for each of the driving topics
(3) A third graph G3 illustrating the likelihood ratio $L_{i,k}$ of feature quantities of the third quantity sequence FQ3 belonging to each of the bins for each of the driving topics
(4) A fourth graph G4 illustrating the likelihood ratio $L_{i,k}$ of feature quantities of the fourth quantity sequence FQ4 belonging to each of the bins for each of the driving topics
(5) A fifth graph G5 illustrating the likelihood ratio $L_{i,k}$ of differential quantities of the first quantity sequence FQ1 belonging to each of the bins for each of the driving topics
(6) A sixth graph G6 illustrating the likelihood ratio $L_{i,k}$ of differential quantities of the second quantity sequence FQ2 belonging to each of the bins for each of the driving topics
(7) A seventh graph G7 illustrating the likelihood ratio $L_{i,k}$ of differential quantities of the third quantity sequence FQ3 belonging to each of the bins for each of the driving topics
(8) An eighth graph G8 illustrating the likelihood ratio $L_{i,k}$ of differential quantities of the fourth quantity sequence FQ4 belonging to each of the bins for each of the driving topics.

The vertical axis of each of the first to eighth graphs G1 to G8 represents an index (see TOPIC INDEX) of the first to twenty-fifth driving topics, and the horizontal axis thereof represents an index (see BIN INDEX OF FEATURE QUANTITIES) of the first to twenty bins.

Each of the graphs G1 to G8 shows, in each of the driving topics, a distribution of the corresponding likelihood ratios $L_{i,k}$ at the respective bins. Specifically, referring to FIG. 5, each of the graphs G1 to G8 shows variations in the likelihood ratios $L_{i,k}$ at the respective bins in each of the driving topics as change of tones of the corresponding regions in the corresponding graph; the tone of each region represents the amount of light in the color from black to white inclusive. That is, the lighter, i.e. the whiter, the tone of a region in a graph is, the higher a corresponding likelihood ratio $L_{i,k}$ is.

The driving-topic generation method extracts primitive behavioral expressions for each of the driving topics from a predetermined primitive behavioral expression list for each of the driving topics in accordance with the graphs G1 to G8. Then, the driving-topic generation method joins the extracted primitive behavioral expressions for each of the driving topics appropriately, thus generating a driver behavioral description for each of the driving topics (see FIG. 4). These driver behavioral descriptions for the respective driving topics are stored in the topic description database 63 to correlate with the respective driving topics.

FIG. 6 schematically illustrates an example of the predetermined primitive behavioral expression list. Referring to FIG. 6, the twenty bins are grouped into first to fourth bin sections. The first bin section corresponds to the first to fifth bins, the second bin section corresponds to the sixth to tenth bins, the third bin section corresponds to the eleventh to fifteenth bins, and the fourth bin section corresponds to the sixteenth to twentieth bins.

The predetermined primitive behavioral expression list shows (1) A first primitive behavioral expression correlating with the first bin section selected for a case where the likelihood ratio $L_{i,k}$ of feature quantities of the first quantity sequence FQ1 belonging to the first bin section is greater than a predetermined threshold value (2) A second primitive behavioral expression correlating with the second bin section selected for a case where the likelihood ratio $L_{i,k}$ of feature quantities of the first quantity sequence FQ1 belonging to the second bin section is greater than a predetermined threshold value (3) A third primitive behavioral expression correlating with the third bin section selected for a case where the likelihood ratio $L_{i,k}$ of feature quantities of the first quantity sequence FQ1 belonging to the third bin section is greater than a predetermined threshold value (4) A fourth primitive behavioral expression correlating with the fourth bin section selected for a case where the likelihood ratio $L_{i,k}$ of feature quantities of the first quantity sequence FQ1 belonging to the fourth bin section is greater than a predetermined threshold value (5) A fifth primitive behavioral expression correlating with other bin sections selected for a case where the likelihood ratio of feature quantities of the first quantity sequence FQ1 belonging to each of the first to fourth bin sections is equal to or smaller than a corresponding one of the predetermined threshold values.

The predetermined primitive behavioral expression list also shows these first to fifth primitive behavioral expressions for feature quantities or differential quantities of each of the second to eighth quantity sequences FQ2 to FQ8 in the same manner as those for feature quantities of the first quantity sequence FQ1. Note that the first to fifth primitive behavioral expressions for differential quantities of the eighth quantity sequence FQ8 are substantially identical to those for feature quantities of the first quantity sequence FQ1 or the second quantity sequence FQ2. Thus, the list for the eighth quantity sequence FQ8 has blank fields.

Specifically, the driving-topic generation method performs a first step of determining whether the likelihood ratio $L_{i,k}$ of feature quantities of the first quantity sequence FQ1 belonging to each of the first to fourth bin sections for the first driving topic is greater than the predetermined threshold value.

When it is determined that the likelihood ratio $L_{i,k}$ of feature quantities of the first quantity sequence FQ1 belonging to at least one of the first to fourth bin sections for the first driving topic is greater than the predetermined threshold value, the driving-topic generation method performs a second step. The second step extracts, from the primitive behavioral expression list, a primitive behavioral expression corresponding to the at least one of the first to fourth bin sections for the first driving topic.

Otherwise, when it is determined that the likelihood ratio $L_{i,k}$ of feature quantities of the first quantity sequence FQ1 belonging to each of the first to fourth bin sections for the first driving topic is equal to or smaller than the predetermined threshold value, the driving-topic generation method performs a third step. The third step extracts, from the primitive behavioral expression list, a primitive behavioral expression corresponding to the other bin sections for the first driving topic.

The driving-topic generation method performs a fourth step. The fourth step performs these operations in the first to third steps for each of the remaining second to eighth quantity sections FQ2 to FQ8 for the first driving topic. This extracts, from the primitive behavioral expression list, a primitive behavioral expression for each of the remaining second to eighth quantity sections FQ2 to FQ8. Then, the driving-topic generation method performs a fifth step of joining the extracted primitive behavioral expressions for the first driving topic appropriately, thus generating a driver behavioral description for the first driving topic (see FIG. 4).

The driving-topic generation method carries out these operations in the first to fifth steps for each of the remaining second to twenty-fifth driving topics. This finally generates driver behavioral descriptions for the respective first to twenty-fifth driving topics (see FIG. 4).

These driver behavioral descriptions generated for the respective first to twenty-fifth driving topics set forth above are stored to correlate with the respective first to twenty-fifth driving topics in the topic-description database 63.

Note that the twenty bins can be grouped into two or three bin sections, or five or more bin sections. In this modification, primitive behavioral expressions should be redefined according to the number of division of the twenty bins.

The driving-topic generation method can use the second type of feature-quantity distributions included in the first to n-th base feature-quantity distributions constituting each of the twenty-five driving topics in order to generate the driver behavioral descriptions for each of the twenty-five driving topics. This modification requests that primitive behavioral expressions should be redefined according to the second type of feature-quantity distributions included in the first to n-th base feature-quantity distributions constituting each of the twenty-five driving topics.

Figure 7:
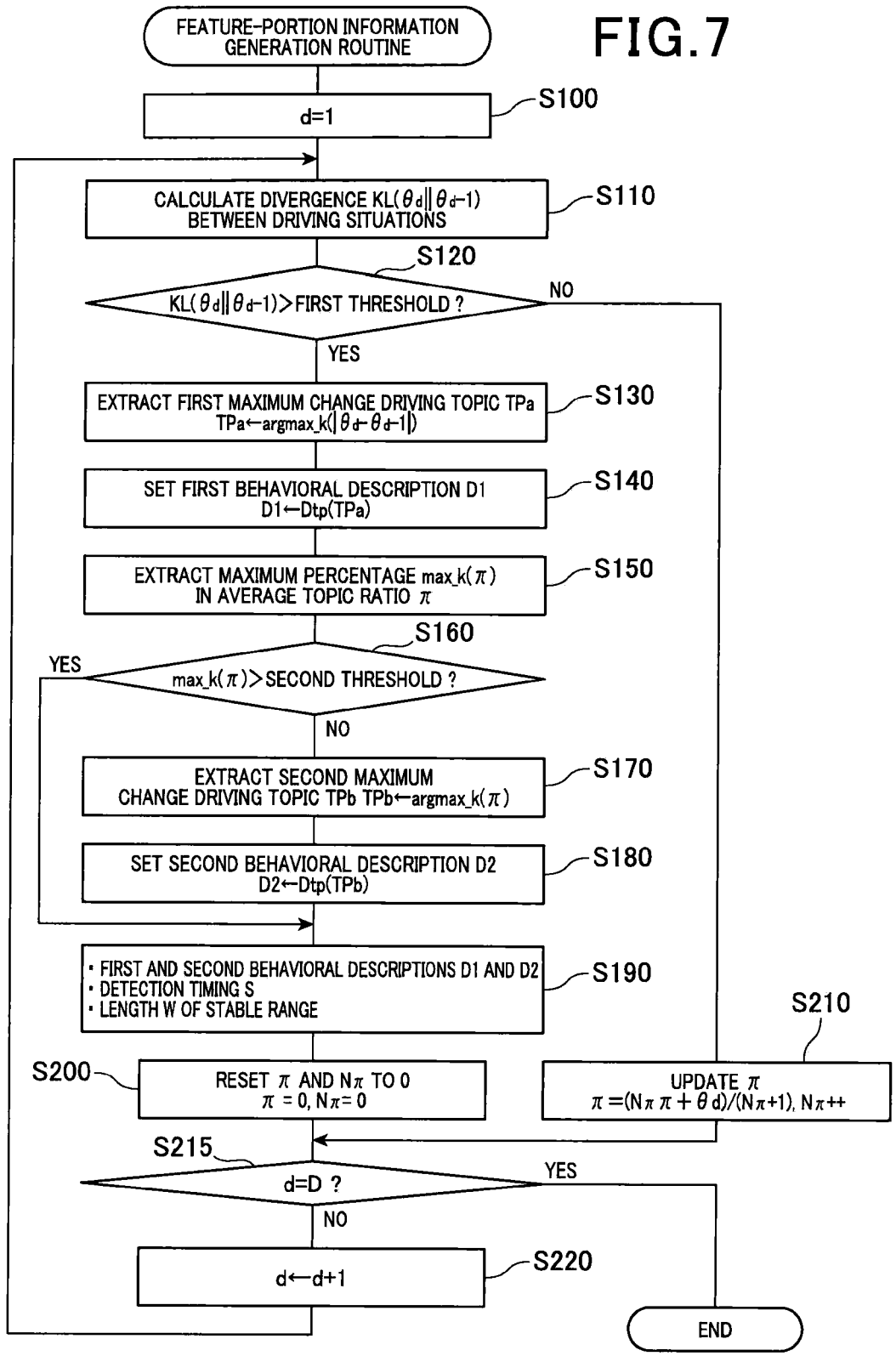
FIG. 7 is a flowchart schematically illustrating a feature-portion information generation routine cyclically carried out by a feature-portion information generator illustrated in FIG. 1 according to this embodiment.
Figure 8:
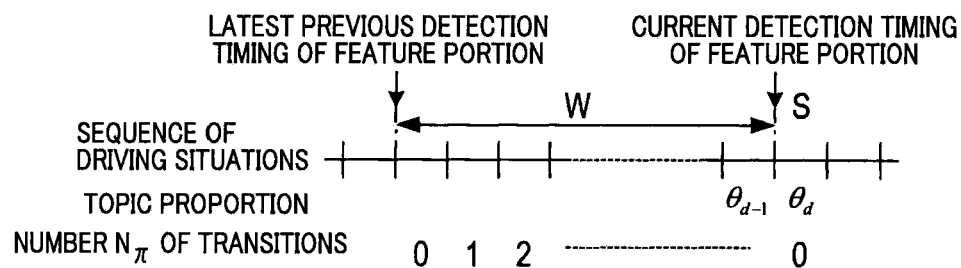
FIG. 8 is a diagram schematically illustrating parameters cooperatively used in the feature-portion information generation routine illustrated in FIG. 7.
Figure 9:
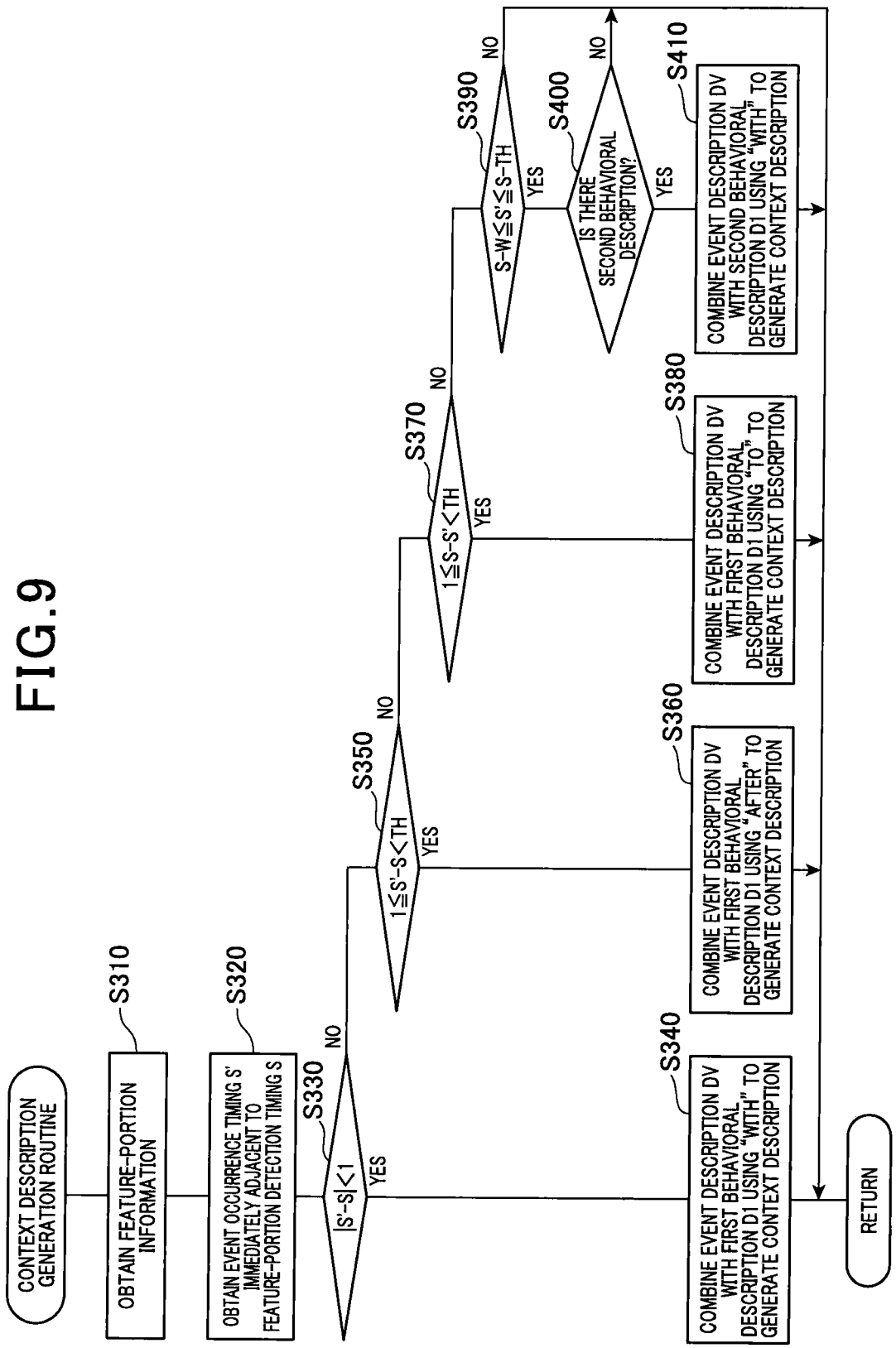
FIG. 9 is a flowchart schematically illustrating a context description generation routine carried out by a context description generator illustrated in FIG. 1 according to this embodiment.

Next, a feature-portion information generation routine cyclically carried out by the feature-portion information generator 64 will be described hereinafter with reference to FIGS. 7 and 8.

When starting the feature-portion information generation routine, the feature-portion information generator 64 sets a variable for identifying one of the D driving situations to an initial value of 1 in step S100. Next, the feature-portion information generator 64 calculates a divergence, i.e. a difference, $KL(\theta_d \| \theta_{d-1})$ between the topic proportion of a target driving situation, for example, a d-th driving situation, and the topic proportion of a latest previous driving situation, which is a (d−1)-th driving situation, in accordance with the following equation in step S110:

$$KL(\theta_d \| \theta_{d-1}) = \sum_{k} \theta_{d,k} \log\left(\frac{\theta_{d,k}}{\theta_{d-1,k}}\right) \quad (7)$$

Where $\theta_d$ represents the topic proportion of the target d-th driving situation, and $\theta_{d-1}$ represents the topic proportion of the (d−1)-th driving situation.

For example, discretizing a known equation for obtaining a Kullback-Leibler divergence, which is a measure of the difference between two probability distributions, obtains the equation (7). That is, the feature-portion information generator 64 uses the topic proportion $\theta_d$ of the target d-th driving situation and the topic proportion $\theta_{d-1}$ of the (d−1)-th driving situation as two probability distributions.

Next, the feature-portion information generator 64 determines whether the divergence $KL(\theta_d \| \theta_{d-1})$ between the target d-th driving situation and the latest previous driving situation (d−1)-th driving situation is greater than a predetermined first threshold in step S120.

When it is determined that the divergence $KL(\theta_d \| \theta_{d-1})$ is greater than the first threshold (YES in step S120), the feature-portion information generator 64 determines that there is a great change between the target d-th driving situation and the latest previous driving situation (d−1)-th driving situation. In other words, the affirmative determination in step S120 results in detection of a feature portion between the target d-th driving situation and the latest previous driving situation (d−1)-th driving situation in the sequence of the driving situations. Then, the feature-portion information generation routine proceeds to step S130.

In step S130, the feature-portion information generator 64 extracts, from the target d-th driving situation, a driving topic argmax_k($|\theta_d - \theta_{d-1}|$) whose corresponding percentage in the topic proportion $\theta_d$ changes most significantly in the percentages of all the driving topics in the topic proportion $\theta_d$. The driving topic argmax_k($|\theta_d - \theta_{d-1}|$) extracted in step S130 will be referred to as a first maximum-change driving topic Tpa or a first noticeable driving topic Tpa.

Following the operation in step S130, the feature-portion information generator 64 refers to the topic description database 63, and retrieves, from the topic description database 63, a topic description Dtp(TPa) defined to correlated with the first maximum-change driving topic TPa in step S140. Then, the feature-portion information generator 64 sets the topic description Dtp(TPa) as a first behavioral description D1 in step S140.

Next, the feature-portion information generator 64 extracts, from an average topic proportion π, which was calculated in step S210 of the latest previous cycle of the feature-portion information generation routine described later, a maximum percentage max_k(π) in all the percentages of the average topic proportion π in step S150 of a current cycle of the feature-portion information generation routine. Note that, if the operation in step S150 is performed while the variable d is set to 1, the average topic proportion π is set to a predetermined initial value of 0. The setting of the average topic proportion π to zero causes the feature-portion information generator 64 to skip the operations in steps S150 to S180.

The maximum percentage max_k(π) will be referred to as a maximum topic max_k(π) hereinafter.

Following the operation in step S150, the feature-portion information generator 64 determines whether the maximum topic max_k(π) is greater than a predetermined second threshold in step S160.

When it is determined that the maximum topic max_k(π) is greater than the second threshold (YES in step S160), the feature-portion information generator 64 determines that there is a noticeable driving topic in the d-th driving situation in step S160. Then, the feature-portion information generation routine proceeds to step S170.

Otherwise, when it is determined that the maximum topic max_k(π) is equal to or smaller than the second threshold (NO in step S160), the feature-portion information generator 64 determines that there are no noticeable driving topics in the d-th driving situation in step S160. Then, the feature-portion information generation routine proceeds to step S190 while skipping steps S170 and S180.

In step S170, the feature-portion information generator 64 extracts, from the average topic proportion π, a driving topic argmax_k(π) having the maximum topic max_k(π) as a second maximum-change driving topic Tpb or a second noticeable driving topic Tpb.

Next, the feature-portion information generator 64 refers to the topic description database 63, and retrieves, from the topic description database 63, a topic description Dtp(TPb) defined to correlated with the second maximum-change driving topic TPb in step S180. Then, the feature-portion information generator 64 sets the topic description Dtp(TPb) as a second behavioral description D2 in step S180.

Following the operation in step S160 or S180, the feature-portion information generator 64 generates feature-portion information, and stores the generated feature-portion information in the memory unit 1b in step S190. Specifically, the feature-portion information includes the first and second behavioral descriptions D1 and D2 set in the respective steps S140 and S180, and the current value of the variable d, which represents a corresponding driving situation and a detection timing S of the corresponding feature portion. The detection timing of a corresponding feature portion will also be referred to as a feature-portion detection timing hereinafter.

Additionally, the feature-portion information includes the length of a stable range W. As illustrated in FIG. 8, the stable range is defined as a range from the latest previous detection timing of the feature portion in step S130 to the current detection timing of the feature portion in step S130, and the stable-range length W is defined as the number $N_\pi$ of transitions of driving situations from the latest detection timing of the feature portion in step S130 to the current detection timing of the feature portion in step S130. Of course, if the negative determination is carried out in step S160, the feature-portion information generator 64 generates feature-portion information without including the second behavioral description D2, and stores the generated feature-portion information in the memory unit 1b in step S190. What the number $N_\pi$ of transitions of driving situations is will be described later.

Following the operation in step S190, the feature-portion information generator 64 resets the average topic proportion E and the number $N_\pi$ of transitions of driving situations to zero in step S200.

On the other hand, when it is determined that the divergence $KL(\theta_d \| \theta_{d-1})$ is equal to or smaller than the first threshold (NO in step S120), the feature-portion information generator 64 determines that there is not a great change between the target d-th driving situation and the latest previous driving situation (d−1)-th driving situation. Then, the feature-portion information generation routine proceeds to step S210.

In step S210, the feature-portion information generator 64 calculates, i.e. updates, the average topic proportion π in accordance with the following equation (8):

$$\pi = \frac{N_\pi \cdot \pi + \theta_d}{N_\pi + 1} \quad (8)$$

In step S210, the feature-portion information generator 64 also increments a current value of the number $N_\pi$ of transitions of driving situations by 1. Then, the feature-portion information generation routine proceeds to step S220.

Following the operation in step S200 or S210, the feature-portion information generator 64 determines whether the current value of the variable d has been set to the number D of all the drive situations in step S215. When it is determined that the current value of the variable d has been set to the number D of all the drive situations (YES in step S215), the feature-portion information generator 64 terminates the feature-portion information generation routine. Otherwise, when it is determined that the current value of the variable d has not been set to the number D of all the drive situations (NO in step S215), the feature-portion information generator 64 increments the variable d by 1, thus updating the current driving situation as a target driving situation to the next driving situation in step S220. Thereafter, the feature-portion information generator 64 returns the operation in step S110, and repeatedly performs the operations in steps S100 to S220.

Specifically, the feature-portion information generation routine detects a feature portion in the sequence of the driving situations when there is a great change of a target driving situation from a latest previous driving situation. Then, the feature-portion information generation routine extracts, from the feature portion, a first driving topic Tpa whose corresponding percentage in the topic proportion of the target driving situation changes most significantly in the percentages of all the driving topics in the topic proportion of the target driving situation. Thereafter, the feature-portion information generation routine sets a first topic description defined for the first driving topic Tpa as the first behavioral description D1.

The feature-portion information generation routine also obtains an average topic proportion π based on all driving situations belonging to the stable range defined as the range from the latest previous detection timing of the feature portion in step S130 to the current detection timing of the feature portion in step S130. Then, the feature-portion information generation routine extracts, from the average topic proportion π, a second driving topic Tpb that has a maximum percentage if the maximum percentage is greater than the second threshold. Thereafter, the feature-portion information generation routine sets a second topic description defined for the second driving topic Tpa as the second behavioral description D2.

Following the setting of the first behavioral description D1 and/or second behavioral description D2, the feature-portion information generation routine stores, in the memory unit 1b, feature-portion information including the first behavioral description D1 and/or second behavioral description D2, the detection timing S of the corresponding feature portion, and the stable-range length W.

The object detector 7 is operative to detect various objects associated with various traffic events according to the driving behavioral data sequences output from the driving-behavior data obtaining unit 2 and the environmental data sequences output from the environmental-data obtaining unit 3.

Each of the traffic events has a potential to impact on driver's driving behaviors of the vehicle V.

Specifically, the traffic events include (1) The occurrence of one of weather conditions, such as rain, snow, strong wind (2) The change of one of the weather conditions to another (3) The change of the state of a road on which the vehicle V is going to travel, such as an ice-covered road or a flooded road (4) The occurrence of one of specific driving operations including starting driving of the vehicle V, making a lane change, turning right or left, overtaking, waiting for a traffic light, applying sudden brakes to the vehicle V, and making a sudden acceleration to the vehicle V (5) The entrance or passage of one of specific points including a tollbooth, an intersection, and a parking lot (6) The existence and/or the behavior of at least one of various mobile objects including a preceding vehicle, vehicles around the vehicle V, and pedestrians (7) The existence of at least one of traffic signs (8) The change of a traffic signal.

Specifically, the objects that the object detector 7 detects are defined as various pieces of information that can be obtained from the driving behavioral data sequences and/or the environmental data sequences, and that are required for detecting the various events. The object detector 7 is operative to detect these objects using at least one of known detection methods.

The event description generator 8 detects at least one traffic event according to a corresponding at least one object detected by the object detector 7 and the group of the feature-quantity distributions for each of the driving situations generated by the feature distribution generator 5. The event description generator 8 includes information I, such as a table or the like, indicative of the relationship between each of traffic events that can be generated by the event description generator 8 and a corresponding one of predetermined event descriptions DV.

Then, the event description generator 8 refers to the information I, and retrieves at least one event description DV that matches with a corresponding at least one traffic event detected thereby. Subsequently, the event description generator 8 generates event information including the at least one event description DV, at least one driving situation S' at which at least one traffic event corresponding to the at least one event description DV is detected. Thereafter, the event description generator 8 stores the event information in the memory unit 1b.

Note that the information I is prepared to be stored beforehand in the memory unit 1b, and a driving situation S' at which a traffic event is detected will also be referred to as an event occurrence timing S' hereinafter.

The event descriptions DV include statements including, for example, "CHANGING LANES", "TAKE THE RAMP TO ROUTE 155", and "WAIT UNTIL LIGHT TURNS GREEN".

Next, a context description generation routine carried out by the context description generator 9 will be described hereinafter with reference to FIGS. 9 and 10A to 10D. Note that the context description generator 9 is programmed to carry out the context description generation routine each time predetermined pieces of the feature-portion information generated by the feature-portion information generator 64 and predetermined pieces of the event information generated by the event description generator 8 are stored in the memory unit 1b.

When starting execution of the context description generation routine, the context description generator 9 extracts one piece of the feature-portion information from a group of pieces of the feature-portion information stored in the memory unit 1b in step S310; the group of pieces of the feature-portion information has been subjected to no operations in steps S320 to S410 described hereinafter. For example, the context description generator 9 extracts one piece of the feature-portion information from the group of pieces of the feature-portion information stored in the memory unit 1b in step S310 in chronological order, i.e. in order of store.

Next, the context description generator 9 retrieves a piece of the event information about a target traffic event, which has occurred immediately adjacent to the feature-portion detection timing S included in the piece of the feature-portion information extracted in step S310, from the pieces of the event information stored in the memory unit 1b in step S320. Then, the context description generator 9 obtains the event occurrence timing S' of the target traffic event from the retrieved piece of the event information in step S320.

Subsequently, the context description generator 9 calculates the absolute difference between the feature-portion detection timing S and the event occurrence timing S' in step S330. Then, the context description generator 9 determines whether the absolute difference between the feature-portion detection timing S and the event occurrence timing S', which is expressed as |S'−S|, is less than 1 in step S330.

When it is determined that the absolute timing difference |S'−S| is equal to or more than 1 (NO in step S330), the context description generator 9 determines that the detection of the feature portion included in the piece of the feature-portion information extracted in step S310 differs in timing from the occurrence of the traffic event obtained in step S320. Then, the context description generation routine proceeds to step S350.

Otherwise, when it is determined that the absolute timing difference |S'−S| is less than 1 (YES in step S330), the context description generator 9 determines that the detection of the feature portion included in the piece of the feature-portion information extracted in step S310 is identical in timing to the occurrence of the traffic event obtained in step S320. Then, the context description generation routine proceeds to step S340.

In step S340, the context description generator 9 generates context information indicative of a context between the event description DV included in the corresponding event information retrieved in step S320 with the first behavioral description D1 included in the piece of the feature-portion information extracted in step S310.

Figure 10A:
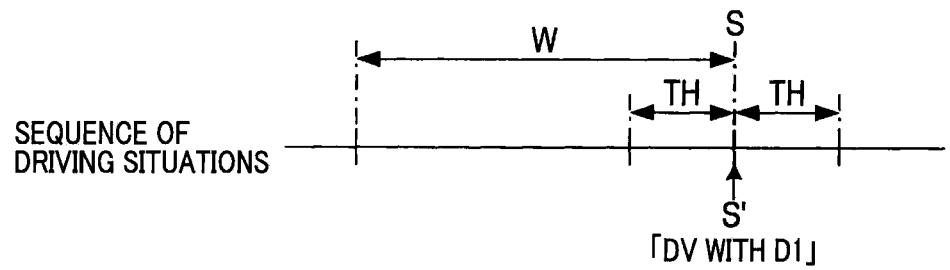
FIG. 10A is a diagram schematically illustrating a temporal relationship between a feature-portion detection timing and an event occurrence timing upon an affirmative determination in step S330 of FIG. 9, and a context description generated in step S340 of FIG. 9.

Specifically, the context description generator 9 combines the event description DV included in the corresponding event information retrieved in step S320 with the first behavioral description D1 included in the piece of the feature-portion information extracted in step S310 using, for example, the word "with", thus generating a context description "DV with D1" (see FIG. 10A). Then, the context description generator 9 stores information indicative of the context description "DV with D1" in the memory unit 1b to correlate with a corresponding feature-portion detection timing S and an event occurrence timing S'. Thereafter, the context description generator 9 terminates the context description generation routine.

In step S350, the context description generator 9 determines whether a deviation of the event occurrence timing S' from the feature-portion detection timing S, which is referred to as (S'−S) is equal to or more than 1, and less than a predetermined causal threshold TH in step S350. That is, the operation in step S350 determines whether, although the event occurrence timing S' is not identical to the feature-portion detection timing S, the event occurrence timing S' is sufficiently close to the feature-portion detection timing S, and is later than the feature-portion detection timing S.

The predetermined causal threshold TH is set to a value that enables a causal relationship between a feature portion corresponding to the feature-portion detection timing S and a traffic event corresponding to the event occurrence timing S' to be established as long as the difference (S'−S) is less than the predetermined causal threshold TH. For example, the causal threshold TH is set to 5 according to this embodiment.

When it is determined that the difference (S'−S) is less than 1 or equal to or more than the causal threshold TH (NO in step S350), the context description generation routine proceeds to step S370. Otherwise, when it is determined that the difference (S'−S) is equal to or more than 1, and less than the causal threshold TH (YES in step S350), the context description generator 9 determines that (1) There is a causality relationship between the feature portion corresponding to the feature-portion detection timing S and the traffic event corresponding to the event occurrence timing S'

(2) The event occurrence timing S' is later than the feature-portion detection timing S, so that the traffic event has occurred after detection of the feature portion.

Then, the context description generation routine proceeds to step S360.

In step S360, the context description generator 9 generates context information indicative of a context between the event description DV included in the corresponding event information retrieved in step S320 with the first behavioral description D1 included in the piece of the feature-portion information extracted in step S310.

Figure 10B:
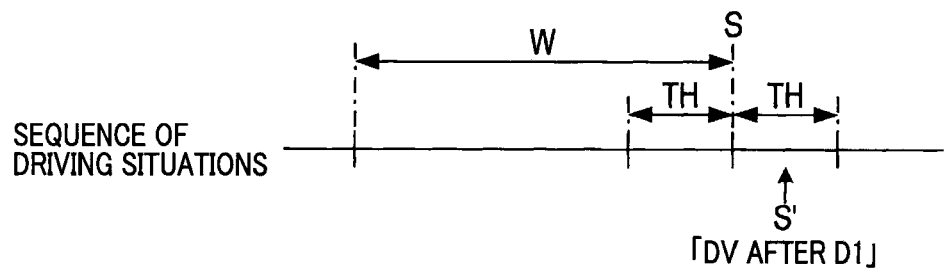
FIG. 10B is a diagram schematically illustrating a temporal relationship between a feature-portion detection timing and an event occurrence timing upon an affirmative determination in step S350 of FIG. 9, and a context description generated in step S360 of FIG. 9.

Specifically, the context description generator 9 combines the event description DV included in the corresponding event information retrieved in step S320 with the first behavioral description D1 included in the piece of the feature-portion information extracted in step S310 using, for example, the word "after", thus generating a context description "DV after D1" (see FIG. 10B).

Then, the context description generator 9 stores information indicative of the context description "DV after D1" in the memory unit 1b to correlate with a corresponding feature-portion detection timing S and an event occurrence timing S'. Thereafter, the context description generator 9 terminates the context description generation routine.

In step S370, the context description generator 9 determines whether a deviation of the feature-portion detection timing S from the event occurrence timing S', which is referred to as (S−S') is equal to or more than 1, and less than the causal threshold TH in step S370. That is, the operation in step S370 determines whether, although the event occurrence timing S' is not identical to the feature-portion detection timing S, the event occurrence timing S' is sufficiently close to the feature-portion detection timing S, and is earlier than the feature-portion detection timing S.

When it is determined that the difference (S−S') is less than 1 or equal to or more than the causal threshold TH (NO in step S370), the context description generation routine proceeds to step S390. Otherwise, when it is determined that the difference (S−S') is equal to or more than 1, and less than the causal threshold TH (YES in step S370), the context description generator 9 determines that (1) There is a causality relationship between the feature portion corresponding to the feature-portion detection timing S and the traffic event corresponding to the event occurrence timing S'

(2) The event occurrence timing S' is earlier than the feature-portion detection timing S, so that the traffic event has occurred before detection of the feature portion.

Then, the context description generation routine proceeds to step S380.

In step S380, the context description generator 9 generates context information indicative of a context between the event description DV included in the corresponding event information retrieved in step S320 with the first behavioral description D1 included in the piece of the feature-portion information extracted in step S310.

Figure 10C:
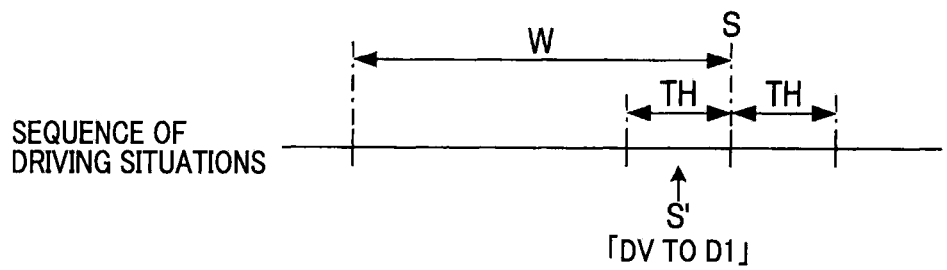
FIG. 10C is a diagram schematically illustrating a temporal relationship between a feature-portion detection timing and an event occurrence timing upon an affirmative determination in step S370 of FIG. 9, and a context description generated in step S380 of FIG. 9.

Specifically, the context description generator 9 combines the event description DV included in the corresponding event information retrieved in step S320 with the first behavioral description D1 included in the piece of the feature-portion information extracted in step S310 using, for example, the word "to", thus generating a context description "DV to D1" (see FIG. 10C). Then, the context description generator 9 stores information indicative of the context description "DV to D1" in the memory unit 1b to correlate with a corresponding feature-portion detection timing S and an event occurrence timing S'. Thereafter, the context description generator 9 terminates the context description generation routine.

In step S390, the context description generator 9 determines whether the event occurrence timing S' is equal to or more than a first threshold (S−W), and equal to or less than a second threshold (S−TH). The first threshold (S−W) is defined by subtraction of the stable-range length W from the feature-portion detection timing S, and the second threshold (S−TH) is defined by subtraction of the causal threshold TH from the feature-portion detection timing S.

That is, the operation in step S390 determines whether, although the event occurrence timing S' is out of an adjacent range defined from the second threshold (S−TH) to the sum of the feature-portion detection timing S and the causal threshold TH, the event occurrence timing S' is within a stable range defined from the latest previous feature-detection timing to the current feature-detection timing S inclusive.

When it is determined that the event occurrence timing S' is less than the first threshold (S−W), or more than the second threshold (S−TH) (NO in step S390), the context description generator 9 terminates the context description generation routine. Otherwise, when it is determined that the event occurrence timing S' is equal to or more than the first threshold (S−W), and equal to or less than the second threshold (S−TH) (YES in step S390), the context description generator 9 determines that (1) There are no causality relationships between the feature portion corresponding to the feature-portion detection timing S and the traffic event corresponding to the event occurrence timing S'

(2) There is a causality relationship between the traffic event corresponding to the event occurrence timing S' and the stable range.

Then, the context description generation routine proceeds to step S400.

In step S400, the context description generator 9 determines whether the piece of the feature-portion information obtained in step S310 includes the second behavioral description D2. When it is determined that the piece of the feature-portion information obtained in step S310 does not include the second behavioral description D2 (NO in step S400), the context description generator 9 terminates the context description generation routine.

Otherwise, when it is determined that the piece of the feature-portion information obtained in step S310 includes the second behavioral description D2 (YES in step S400), the context description generation routine proceeds to step S410.

In step S410, the context description generator 9 generates context information indicative of a context between the event description DV included in the corresponding event information retrieved in step S320 with the second behavioral description D2 included in the piece of the feature-portion information extracted in step S310.

Figure 10D:
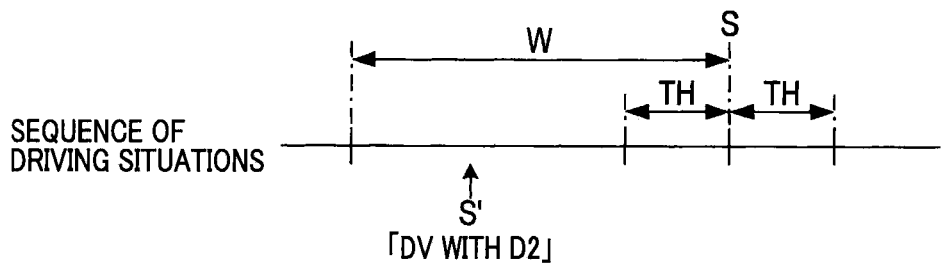
FIG. 10D is a diagram schematically illustrating a temporal relationship between a feature-portion detection timing and an event occurrence timing upon an affirmative determination in each of steps S390 and S400 of FIG. 9, and a context description generated in step S410 of FIG. 9.

Specifically, the context description generator 9 combines the event description DV included in the corresponding event information retrieved in step S320 with the second behavioral description D2 included in the piece of the feature-portion information extracted in step S310 using the word "with", thus generating a context description "DV to D1" (see FIG. 10D). Then, the context description generator 9 stores information indicative of the context description "DV with D2" in the memory unit 1b to correlate with a corresponding feature-portion detection timing S and an event occurrence timing S'. Thereafter, the context description generator 9 terminates the context description generation routine.

The output unit 10 outputs information based on the context description generated by the context description generator 9 to an in-vehicle driving system installed in the vehicle V or a user, such as a driver of the vehicle V. In other words, the output unit 10 provides a description indicative of a casual-and-effect relationship between a traffic event and a noticeable driving behavior in a feature portion or a stable range to an in-vehicle driving system installed in the vehicle V and/or a user, such as a driver of the vehicle V.

When providing the context description to the in-vehicle driving system, the output unit 10 can provide, to the in-vehicle driving system, the context description, the corresponding event description, and the corresponding behavioral description to which different identifies are assigned. If the in-vehicle driving system can store a relationship between each identifier and a corresponding one of various descriptions, the output unit 10 can provide, to the in-vehicle driving system, the combination of identifies assigned to the context description, the corresponding event description, and the corresponding behavioral description.

As another example, the output unit 10 can provide, to the in-vehicle driving system, a combination of the context description, the corresponding event description, and the corresponding behavioral description to which an identifier is assigned. If the in-vehicle driving system can store a relationship between each identifier and a corresponding combination of various descriptions, the output unit 10 can provide, to the in-vehicle driving system, the identifier assigned to the combination of the context description, the corresponding event description, and the corresponding behavioral description.

When providing the context description to a user, the output unit 10 can provide, to a user, information based on the context description via the output device 1c; the information is for example visibly or audibly understandable, i.e. recognizable, by users.

For example, the output unit 10 can mark or highlight at least one point at which a corresponding context description for a previously specified traffic event, such as a potentially serious traffic incident, is generated on a map displayed on a display device of the output device 1c. The map having at least one marked or highlighted point at which a corresponding context description for a potentially serious traffic incident is generated will be referred to as a potential traffic-incident map hereinafter.

Figure 11:
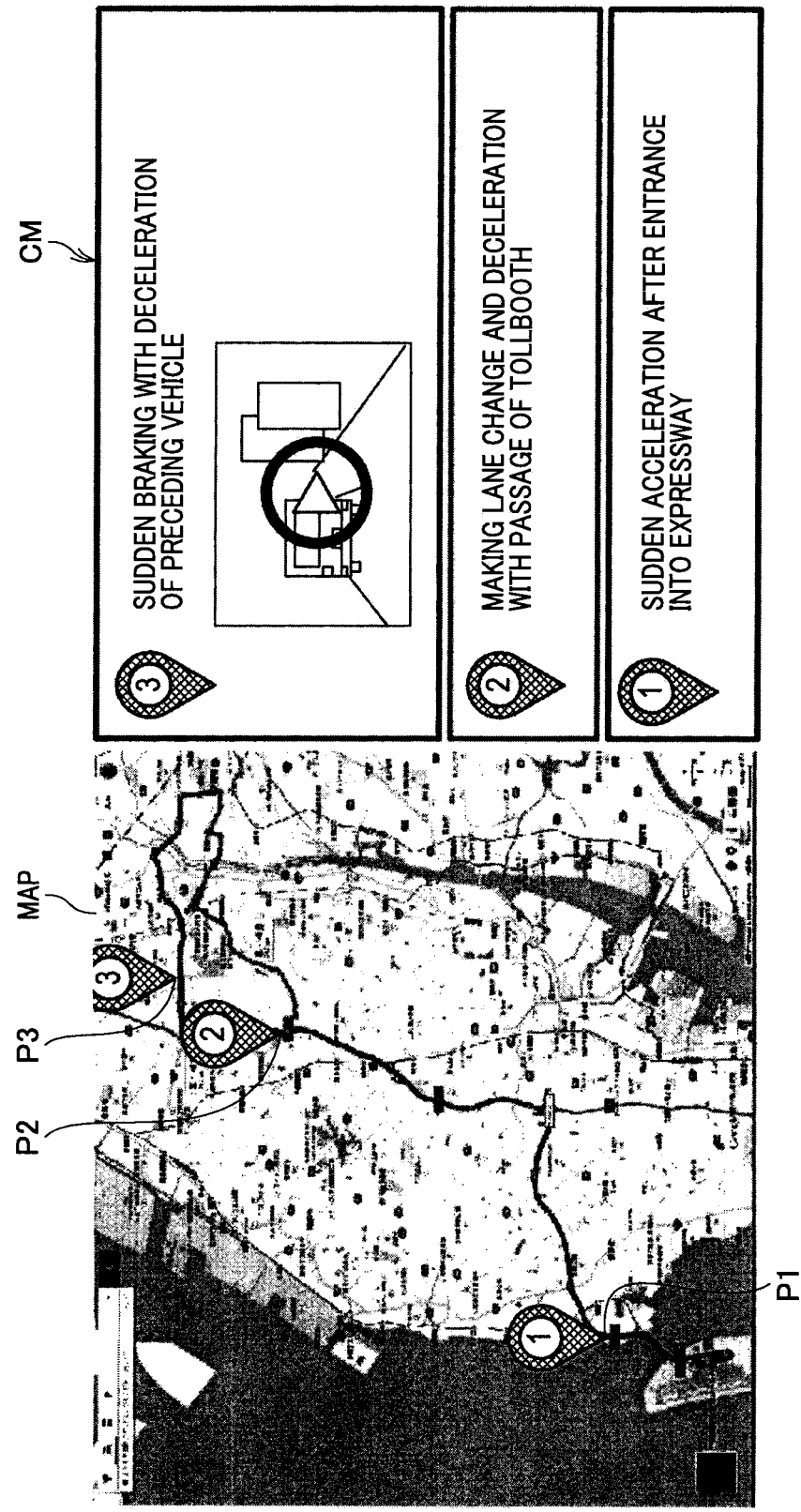
FIG. 11 is a diagram schematically illustrating an example of a potential traffic-incident map according to this embodiment.

While marking at least one point, at which a corresponding context description is generated, on the potential traffic-incident map displayed on the display unit, the output unit 10 can display, on at least one point of the potential traffic-incident map, a visual comment CM indicative of a corresponding context description. For example, referring to FIG. 11, on the potential traffic-incident map MAP displayed on the display unit, three points P1, P2, P3 are highlighted, and the following visual comments CM each indicative of a context description determined for a corresponding one of the points P1 to P3 are displayed:

(1) SUDDEN ACCELERATION AFTER ENTRANCE INTO EXPRESSWAY (2) MAKING LANE CHANGE AND DECELERATION WITH PASSAGE OF TOLLBOOTH (3) SUDDEN BRAKING WITH DECELERATION OF PRECEDING VEHICLE

As described in detail above, the driving context generation system 1 is configured to generate causality relationships between each of driver's driving behaviors, which include normal land abnormal behaviors, and a corresponding one of traffic events. Then, the driving context generation system 1 is configured to generate a context description that expresses each of the causality relationships. This configuration makes it possible to provide such a context description based on a causality relationship of a driver's driving behavior with respect to a traffic event to, for example, a driver of the vehicle V when the vehicle V is expected to encounter the traffic event. That is, every time the vehicle V is about to encounter a traffic event, the driving context generation system 1 enables assistance of driver's driving according to a causality relationship between a driver's driving behavior and the corresponding traffic event. In particular, the driving context generation system 1 is capable of providing, to a driver of the vehicle V, a context description about the risk of the occurrence of potentially serious traffic incident at each of corresponding points on a map. This enables the driver to perform a driving that prevents the occurrence of potentially serious traffic incidents and/or the occurrence of traffic accidents.

The driving context generation system 1 is configured to detect a feature portion in the sequence of the driving situations when there is a great change of a target driving situation from a latest previous driving situation with respect to a target driving situation. Then, the driving context generation system 1 is configured to extract, from the feature portion, a first driving topic Tpa whose corresponding percentage in the topic proportion of the target driving situation changes most significantly in the percentages of all the driving topics in the topic proportion of the target driving situation. Thereafter, the driving context generation system 1 is configured to set a first topic description defined for the first driving topic Tpa as a first behavioral description D1.

This configuration of the driving context generation system 1 reduces driving topics used as the first driving topic Tpa to which corresponding topic descriptions Dtp are defined. This configuration therefore enables the first behavioral descriptions D1 generated for the respective narrowed first driving topics Tpa to easily correlate with corresponding event descriptions DV.

Additionally, the driving context generation system 1 is configured to obtain an average topic proportion $\pi$ based on all the driving situations belonging to the stable range defined from the range from the latest previous detection timing of the feature portion to the current detection timing of the feature portion. Then, the driving context generation system 1 is configured to extract, from the average topic proportion $\pi$, a second driving topic Tpb that has a maximum percentage in the percentages of all the driving topics if the maximum percentage is greater than the second threshold. Thereafter, the driving context generation system 1 is configured to set a second topic description defined for the second driving topic Tpa as the second behavioral description D2.

This configuration of the driving context generation system 1 reduces driving topics used as the second driving topic Tpb to which corresponding topic descriptions Dtp are defined. This configuration therefore enables the second behavioral descriptions D2 generated for the respective narrowed second driving topics Tpb to easily correlate with corresponding event descriptions DV.

There are usually wide variations in time lags between each traffic event and a corresponding one of driver's driving behaviors. This makes it difficult to combine each traffic event with a corresponding one of the driver's driving behaviors on a simple time axis.

In view of this point, the driving context generation system 1 is configured to discretize the driving behavioral data sequences based on the driver's driving behaviors into a plurality of segmented behavior-data sequences; each of the segmented behavior-data sequences belongs to a corresponding one of the driving situations.

This configuration enables one or more traffic events to combine with corresponding one or more driver's driving behaviors for each of the driving situations, thus reducing adverse effects due to the variations in time lags between each traffic event and a corresponding one of driver's driving behaviors. This improves the accuracy of determination of whether there is a causality relationship between each traffic event and a corresponding one of driver's driving behaviors.

The driving context generation system 1 is configured to automatically generate context descriptions each including a behavioral description for a driver's driving behavior and a corresponding event description for a traffic event combined with each other. This configuration is effective in using a large number of driving behavioral data sequences and environmental data sequences without the need of user's burdens.

Let us assume that the driving context generation system 1 is configured to provide user-understandable context descriptions generated thereby to an integrative drive assist system installed in the vehicle V. In this assumption, the driving context generation system 1 enables the integrative drive assist system to recommend, to the driver, driving assistance information sensitive to a surrounding condition to the driver of the vehicle V while providing a user-understandable context description corresponding to the surrounding condition; the user-understandable context description associated with the recommended driving assistance information. The provided user-understandable context description enables the driver to understand why such drive assistance information is recommended to the driver, resulting in the driver having a higher reliability for the integrative drive assist system.

The driving context generation system 1 can be applied for various services and systems, the following examples of which will be described hereinafter.

A driving log service, which keeps a record of driving data, preferably uses the driving context generation system 1. This is because the driving context generation system 1 is capable of extracting at least one noticeable driving topic in each of the driving situations, and generating a user-understandable context description for each of the driving situations based on the extracted at least one driving topic. That is, the characteristics of the driving context generation system 1 enable the driving log service to express a long-duration drive of the vehicle V using the user-understandable context descriptions. This results in a driving diary based on user-understandable context descriptions to be automatically generated. The characteristics of the driving context generation system 1 enable the driving context generation system 1 to be applied for driving management services and social network services.

A driving information providing system also preferably uses the driving context generation system 1. As described above, the driving context generation system 1 is capable of generating pairs of driver's driving behaviors and corresponding traffic events. This characteristic enables the driving information providing system to predict or recognize a driver's driving behavior when the vehicle V is about to encounter a specific traffic event matching with the driver's driving behavior. Thus, the driving information providing system is capable of automatically providing information suitable for the predicted driver's driving behavior when the vehicle V is about to encounter a specific traffic event matching with the predicted driver's driving behavior. For example, the driving information providing system is capable of automatically providing information associated with a right lane suitable for making a lane change when the vehicle V is about to accelerate for overtaking a preceding vehicle. This makes it possible to assist the driver of the vehicle V to smoothly perform the predicted driving behavior.

A driving assistance agent system further preferably uses the driving context generation system 1. As described above, the driving context generation system 1 is capable of generating pairs of driver's driving behaviors and corresponding traffic events. This characteristic enables the driving assistance agent system to narrow traffic events predicted to occur in response to a driver's specific driving behavior.

For example, the driving assistance agent system is capable of asking the driver of the vehicle V for permission to activate an automatic parking system when the vehicle V starts decelerating near a parking place. This enables smooth transfer of the authority to control the vehicle V between the driver and the automatic parking system.

Additionally, change of a current driving situation to another driving situation causes a certain amount of processing load to be applied on the driver of the vehicle V. In such a case, the driving assistance agent system is capable of performing smooth interaction with respect to the driver when the current driving situation is changed to another driving situation. This reduces processing load to be applied on the driver when the current driving situation is changed to another driving situation.

Moreover, a system for automatically generating a traffic-accident database preferably uses the driving context generation system 1. Specifically, each time a traffic event of a traffic accident, a traffic violation, or a vehicle's malfunction occurs, the driving context generation system 1 is capable of storing, in a traffic-accident database, the traffic event to correlate with a driver's driving behavior directly causing the traffic accident, the traffic violation, or the vehicle's malfunction using a corresponding context description indicative of the causality relationship between the traffic event and the driver's driving behavior. The traffic-accident data base generated by the system enables detailed information about traffic accidents, traffic violations, and/or vehicle's malfunctions to be accurately recognized by the driver or others. The traffic-accident data base generated by the system also enables the driver or others to easily retrieve detailed information about one of the traffic accidents, traffic violations, and/or vehicle's malfunctions stored therein.

The present disclosure is not limited to the descriptions of this embodiment, and the descriptions of this embodiment can be widely modified within the scope of the present disclosure.

The driving context generation system 1 according to this embodiment is installed in the vehicle V, but at least one of the components 4 to 10 of the driving context generation system 1 except for the driving-behavior data obtaining unit 2 and environmental-data obtaining unit 3 can be provided outside the vehicle V. This modification is configured such that the components 4 to 6 can communicate with the driving-behavior data obtaining unit 2 and environmental-data obtaining unit 3 via radio waves. For example, the behavior description generator 6, and event description generator 8, context description generator 9, and output unit 10 can be provided outside the vehicle V.

The driving situation discretizer 4 according to this embodiment uses the double articulation analyzer (DAA) to discretize the driving behavioral data sequences into a plurality of segmented behavior-data sequences; each of the segmented behavior-data sequences belongs to a corresponding one of the driving situations. However, the present disclosure is not limited to the configuration. Specifically, the driving situation discretizer 4 according to a modification can use a discretizing technology disclosed in Japanese Patent Application Publication No. 2013-250663 or Japanese Examined Patent Publication No. 4781104. The disclosures of the patent documents No. 2013-250663 and No. 4781104 are incorporated entirely herein by reference.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:
1. A driving context generation system comprising:
a discretizer configured to discretize at least one driving behavioral data sequence representing time-series driving behaviors of a vehicle into segmented behavior-data sequences, each of the segmented behavior-data sequences corresponding to one of sequential driving situations of the vehicle;
a behavior description generator configured to:
extract a feature portion from at least one of the segmented behavior-data sequences corresponding to at least one target driving situation included in the sequential driving situations; and generate behavior-description information indicative of a description of a driver's behavior associated with the at least one target driving situation;

an event description generator configured to:

sequentially detect traffic events in at least one environmental data sequence indicative of time-series driving environments of the vehicle, each of the detected traffic events having a potential to impact on driver's driving behaviors of the vehicle; and generate event-description information including a description indicative of each of the detected traffic events; and a context description generator configured to:

extract, from the sequentially detected traffic events, one target traffic event that is detected immediately adjacent to the feature portion; and generate context information indicative of a context between the behavior-description information generated by the behavior description generator and the event-description information about the target traffic event generated by the event description generator.

2. The driving context generation system according to claim 1, wherein the context description generator is configured to:

obtain information indicative of a temporal relationship between the feature portion and the target traffic event; and combine, based on the temporal relationship, the behavior description information with the event-description information, thus generating the context information.

3. The driving context generation system according to claim 1, wherein:

the behavior description generator comprises:

a feature-quantity distribution generator configured to generate, for each of the driving situations:

a feature-quantity distribution of appearance frequencies of feature quantities included in a corresponding one of the segmented behavior-data sequences; and a feature-quantity distribution of appearance frequencies of feature quantities included in the at least one environmental data sequence, thus obtaining a group of the feature-quantity distributions for each of the driving situations;

a topic proportion calculator configured to:

store therein a group of driving topics each representing a corresponding basic driving situation that frequently appears while the vehicle is travelling, information about the driving topics being used to express the group of the feature-quantity distributions for each of the driving situations as a combination of at least ones of the driving topics;

select ones of the driving topics for each of the driving situations; and calculate, as a topic proportion for each of the driving situations, percentages of the selected driving topics with respect to the whole of the selected driving topics such that the calculated percentages of the selected driving topics for each of the driving situations expresses the group of the feature-quantity distributions included in a corresponding one of the driving situations;

a topic description storage configured to store therein driver behavioral descriptions defined to correlate with the respective driving topics; and a behavioral description extracting unit configured to:

extract the feature portion from the sequential driving situations;

extract, as a noticeable driving topic, one of the driving topics that is noticeable at the at least one target driving situation according to the calculated topic proportion for the at least one target driving situation; and extract one of the driver behavioral descriptions correlating with the noticeable driving topic as the behavior-description information.

4. The driving context generation system according to claim 3, wherein the behavior description generator is configured to:

calculate a divergence between the topic proportions of each pair of temporally adjacent driving situations in the sequential driving situations; and extract, as the feature portion, a specific pair of temporally adjacent first and second driving situations when the divergence of the topic proportions of the specific pair of temporally adjacent first and second driving situations is greater than a predetermined threshold.

5. The driving context generation system according to claim 4, wherein the behavior description generator is configured to:

extract, as the noticeable driving topic, a driving topic whose corresponding percentage during a duration of the temporally adjacent first and second driving situations changes most significantly in the percentages of all the driving topics during the duration of the temporally adjacent first and second driving situations.

6. The driving context generation system according to claim 4, wherein the behavior description generator is configured to:

repeatedly extract the feature portion;

calculate an average topic proportion based on all driving situations belonging to a stable range defined as a range between the repeatedly extracted feature portions; and extract, from the average topic proportion, a driving topic having a maximum percentage in the average topic proportion as a second noticeable driving topic.

7. The driving context generation system according to claim 5, wherein the behavior description generator is configured to:

repeatedly extract the feature portion;

calculate an average topic proportion based on all driving situations belonging to a stable range defined as a range between the repeatedly extracted feature portions; and extract, from the average topic proportion, a driving topic having a maximum percentage in the average topic proportion as a second noticeable driving topic.

8. A computer program product for a driving context generation system, the computer program product comprising:

a non-transitory computer-readable storage medium; and a set of computer program instructions embedded in the computer-readable storage medium, the instructions causing a computer to carry out:

a first step of discretizing at least one driving behavioral data sequence representing time-series driving behaviors of a vehicle into segmented behavior-data sequences, each of the segmented behavior-data sequences corresponding to one of sequential driving situations of the vehicle;

a second step of extracting a feature portion from at least one of the segmented behavior-data sequences corresponding to at least one target driving situation included in the sequential driving situations;

a third step of generating behavior-description information indicative of a description of a driver's behavior associated with the at least one target driving situation;

a fourth step of sequentially detecting traffic events in at least one environmental data sequence indicative of time-series driving environments of the vehicle, each of the detected traffic events having a potential to impact on driver's driving behaviors of the vehicle;

a fifth step of generating event-description information including a description indicative of each of the detected traffic events;

a sixth step of extracting, from the sequentially detected traffic events, one target traffic event that is detected immediately adjacent to the feature portion; and a seventh step of generating context information indicative of a context between the behavior-description information generated by the third step and the event-description information about the target traffic event generated by the fifth step.

9. A driving context generation method comprising:

a first step of discretizing at least one driving behavioral data sequence representing time-series driving behaviors of a vehicle into segmented behavior-data sequences, each of the segmented behavior-data sequences corresponding to one of sequential driving situations of the vehicle;

a second step of extracting a feature portion from at least one of the segmented behavior-data sequences corresponding to at least one target driving situation included in the sequential driving situations;

a third step of generating behavior-description information indicative of a description of a driver's behavior associated with the at least one target driving situation;

a fourth step of sequentially detecting traffic events in at least one environmental data sequence indicative of time-series driving environments of the vehicle, each of the detected traffic events having a potential to impact on driver's driving behaviors of the vehicle;

a fifth step of generating event-description information including a description indicative of each of the detected traffic events;

a sixth step of extracting, from the sequentially detected traffic events, one target traffic event that is detected immediately adjacent to the feature portion; and a seventh step of generating context information indicative of a context between the behavior-description information generated by the third step and the event-description information about the target traffic event generated by the fifth step.

* * * * *

UNITED STATES PATENT AND TRADEMARK OFFICE
CERTIFICATE OF CORRECTION

PATENT NO. : 9,527,384 B2  
APPLICATION NO. : 14/731766  
DATED : December 27, 2016  
INVENTOR(S) : Takashi Bando et al.

It is certified that error appears in the above-identified patent and that said Letters Patent is hereby corrected as shown below:

At Column 1, Line number 4, (73) Assignees, "THE RITSUMEIKAN TRUST, Nakagyo-Ku, Aichi-pref. (JP)" should be --THE RITSUMEIKAN TRUST, Nakagyo-Ku, Kyoto (JP)--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*